United States Patent
He et al.

(10) Patent No.: US 10,917,191 B2
(45) Date of Patent: *Feb. 9, 2021

(54) METHODS AND APPARATUS FOR IMPROVING THE SKEW TOLERANCE OF A COHERENT OPTICAL TRANSPONDER IN AN OPTICAL COMMUNICATION SYSTEM

(71) Applicant: Juniper Networks, Inc., Sunnyvale, CA (US)

(72) Inventors: Xuan He, San Jose, CA (US); Qiang Wang, San Carlos, CA (US); Yang Yue, Milpitas, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/712,188

(22) Filed: Dec. 12, 2019

(65) Prior Publication Data

US 2020/0119831 A1 Apr. 16, 2020

Related U.S. Application Data

(63) Continuation of application No. 15/970,485, filed on May 3, 2018, now Pat. No. 10,547,408.

(51) Int. Cl.
*H04B 10/2507* (2013.01)
*H04J 14/06* (2006.01)
(Continued)

(52) U.S. Cl.
CPC .......... *H04J 14/06* (2013.01); *G02B 6/12007* (2013.01); *H04B 10/2507* (2013.01);
(Continued)

(58) Field of Classification Search
None
See application file for complete search history.

(56) References Cited

U.S. PATENT DOCUMENTS 6,404,522 B1 6/2002 Handelman
7,149,424 B2 12/2006 Kamalov et al.
(Continued)

OTHER PUBLICATIONS

Cai, J. X. et al., "64QAM Based Coded Modulation Transmission Over Transoceanic Distance with > 60 Tb/s Capacity," Optical Fiber Communication Conference Post Deadline Papers, OSA Technical Digest (online) (Optical Society of America, 2015), Paper Th5C.8, 3 pages.

(Continued)

*Primary Examiner* — Li Liu
(74) *Attorney, Agent, or Firm* — Cooley LLP

(57) ABSTRACT

In some embodiments, an apparatus includes a memory and a processor operatively coupled to the memory. The processor is configured to be operatively coupled to a first optical transponder and a second optical transponder. The processor is configured to receive, from the second optical transponder, a signal representing a skew value of an optical signal and a signal representing a bit-error-rate (BER) value of the optical signal. The skew value is associated with a skew between an in-phase component of the optical signal and a quadrature component of the optical signal. The processor is configured to determine, based on at least one of the skew value or the BER value, if a performance degradation of the first optical transponder satisfies a threshold. The processor is configured to send a control signal to the first optical transponder to adjust a pulse shaping or a data baud rate of the first optical transponder.

17 Claims, 12 Drawing Sheets

(51) Int. Cl.
 G02B 6/12 (2006.01)
 H04B 10/61 (2013.01)
 H04Q 11/00 (2006.01)
(52) U.S. Cl.
 CPC ..... H04B 10/25073 (2013.01); H04B 10/612 (2013.01); H04B 10/614 (2013.01); H04B 10/616 (2013.01); H04B 10/6165 (2013.01); *H04Q 2011/0037* (2013.01)

(56) References Cited

U.S. PATENT DOCUMENTS

| | | | |
|---|---|---|---|
| 7,826,752 B1 | 11/2010 | Zanoni et al. | |
| 9,031,420 B2 | 5/2015 | Sakamoto | |
| 9,184,834 B1 | 11/2015 | Zhang et al. | |
| 9,240,843 B1 | 1/2016 | Malouin et al. | |
| 9,438,350 B1 | 9/2016 | Schmidt et al. | |
| 9,749,057 B2 | 8/2017 | Yue et al. | |
| 9,847,841 B1* | 12/2017 | Kaneda | H04B 10/548 |
| 10,225,008 B1 | 3/2019 | Vassilieva et al. | |
| 10,547,408 B2* | 1/2020 | He | G02B 6/12007 |
| 2009/0196602 A1* | 8/2009 | Saunders | H04B 10/532 398/26 |
| 2010/0067902 A1 | 3/2010 | Sun et al. | |
| 2010/0239260 A1* | 9/2010 | Oikawa | H04B 10/2513 398/81 |
| 2011/0150505 A1* | 6/2011 | Roberts | H04B 10/6161 398/208 |
| 2013/0108276 A1 | 5/2013 | Kikuchi | |
| 2013/0170831 A1* | 7/2013 | Rahn | H04B 10/0779 398/29 |
| 2013/0259487 A1* | 10/2013 | Sakamoto | H04B 10/50 398/135 |
| 2014/0093240 A1 | 4/2014 | Mertz et al. | |
| 2015/0341121 A1 | 11/2015 | Yue et al. | |
| 2016/0344508 A1* | 11/2016 | DeAndrea | H04B 10/0773 |
| 2018/0076901 A1 | 3/2018 | Yue et al. | |
| 2018/0109315 A1 | 4/2018 | Bouda | |

OTHER PUBLICATIONS

Chaouch, H. et al., "Analog Coherent Optics for Long Haul Datacenter Regional Networks," J. of Lightwave Technol. 36(2):372-376 (Jan. 15, 2018).
Chen, X. et al., "All-Electronic 100-GHz Bandwidth Digital-to-Analog Converter Generating PAM Signals up to 190 GBaud," J. Lightwave Technol. 35(3):411-417 (Feb. 1, 2017).
Chen, H. et al., "An Accurate and Robust In-phase/Quadrature Skew Measurement for Coherent Optical Transmitter by Image Spectrum Analyzing," in Proceeding of ECOC 2017, 43rd European Conference on Optical Communication (2017), 3 pages.
Diniz, J. C. M. et al., "Time Skew Estimator for Dual-Polarization QAM Transmitters," in Proceeding of ECOC 2017, 43rd European Conference on Optical Communication (2017), 3 pages.
Faruk, M. S. et al., "Digital Signal Processing for Coherent Transceivers Employing Multilevel Formats," J. of Lightwave Technol. 35(5):1125-1141 (Mar. 1, 2017).
Fludger, C.R.S. et al., "Transmitter Impairment Mitigation and Monitoring for High Baud-Rate, High Order Modulation Systems," in Proceeding of ECOC 2016, 42nd European Conference on Optical Communications, Sep. 18-22, 2016, Dusseldorf, 3 pages.
International Telecommunication Union, ITU-T, Standard G.694.1, Series G: Transmission Systems and Media, Digital Systems and Networks, Transmission media and optical systems characteristics—Characteristics of optical systems, "Spectral grids for WDM applications: DWDM frequency grid," Feb. 2012, 16 pages.
Paskov, M. et al., "Blind Equalization of Receiver In-Phase/Quadrature Skew in the Presence of Nyquist Filtering," IEEE Photonics Technology Letters, 25(24):2446-2449 (Dec. 15, 2013).
Peng, W-R. et al., "Transmission of High-Baud PDM-64QAM Signals," J. Lightwave Technol. 31(13):2146-2162 (Jul. 1, 2013).
Porto da Silva, E. et al., "Widely Linear Equalization for IQ Imbalance and Skew Compensation in Optical Coherent Receivers," J. of Lightwave Technol. 34(15):3577-3586 (Aug. 1, 2016).
Rios-Muller, R. et al., "Blind Receiver Skew Compensation and Estimation for Long-Haul Non-Dispersion Managed Systems Using Adaptive Equalizer," J. of Lightwave Technol. 33(7):1315-1318 (Apr. 1, 2015).
Roberts, K. et al., "High Capacity Transport—100G and Beyond," J. Lightwave Technol. 33(3):563-578 (Feb. 1, 2015).
Stojanovic, N. et al., "An Efficient Method for Skew Estimation and Compensation in Coherent Receivers," IEEE Photonics Technology Letters, 28(4):489-492 (Feb. 15, 2016).
Tanimura, T. et al., "A simple digital skew compensator for coherent receiver," Proceeding of ECOC 2009, 35th European Conference on Optical Communication, Sep. 20-24, 2009, Vienna, Austria, Paper 7.3.2, 2 pages.
Wang, J. et al., "Generate Nyquist-WDM Signal Using a DAC With Zero-Order Holding at the Symbol Rate," J. of Lightwave Technol. 32(24):4687-4693 (Dec. 15, 2014).
Wei, J. et al., "400 Gigabit Ethernet Using Advanced Modulation Formats: Performance, Complexity, and Power Dissipation," Optical Communications, IEEE Communications Magazine, 53(2):182-189 (Feb. 2015).
Yue, Y. et al., "Detection and Alignment of Dual-Polarization Optical Quadrature Amplitude Transmitter IQ and XY Skews Using Reconfigurable Interference," Opt. Express 24(6):6719-6734; Received Jan. 25, 2016; Revised Mar. 14, 2016; Accepted Mar. 15, 2016; Published Mar. 18, 2016.
Extended European Search Report for European Application No. 19165388.0, dated Sep. 24, 2019, 9 pages.

* cited by examiner

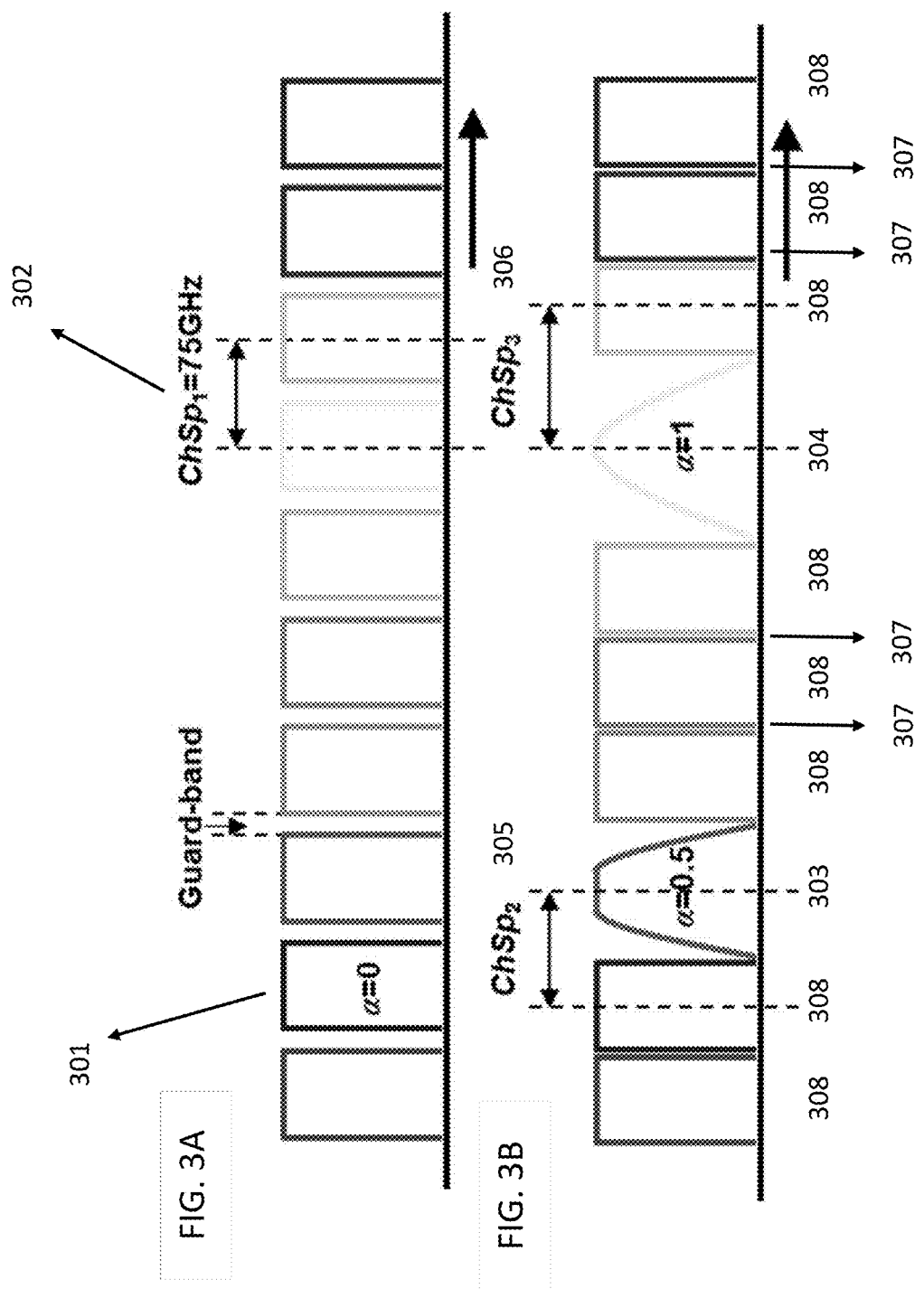

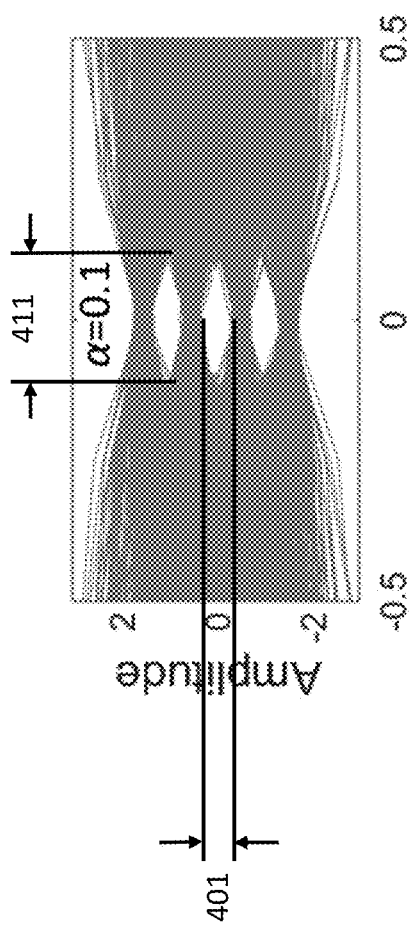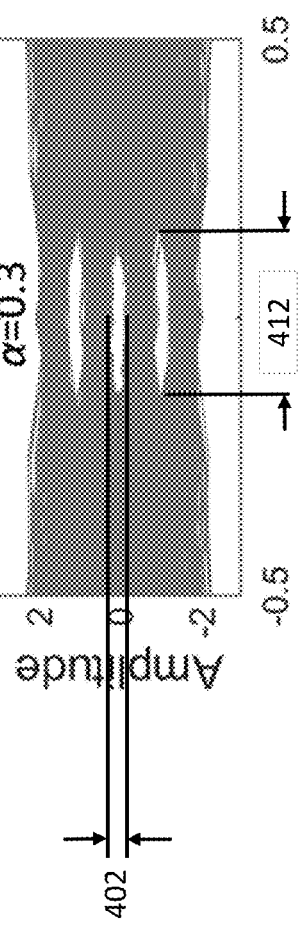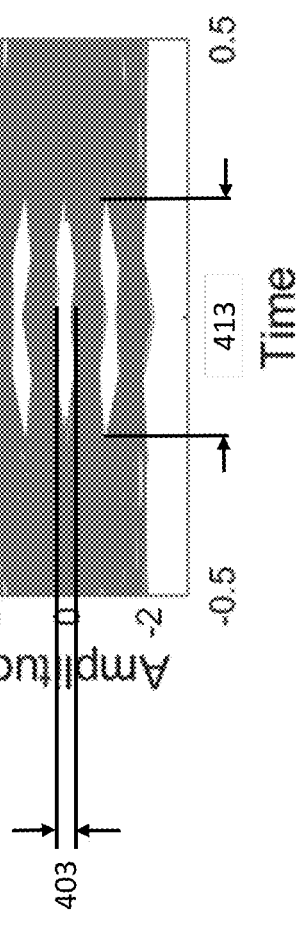

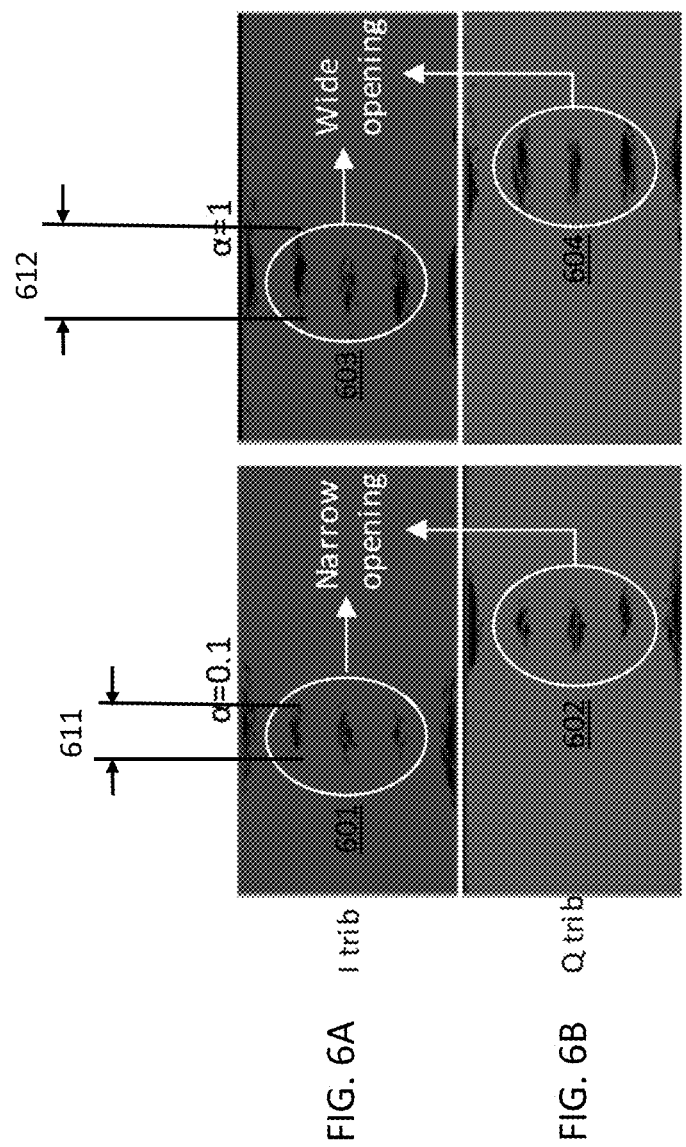

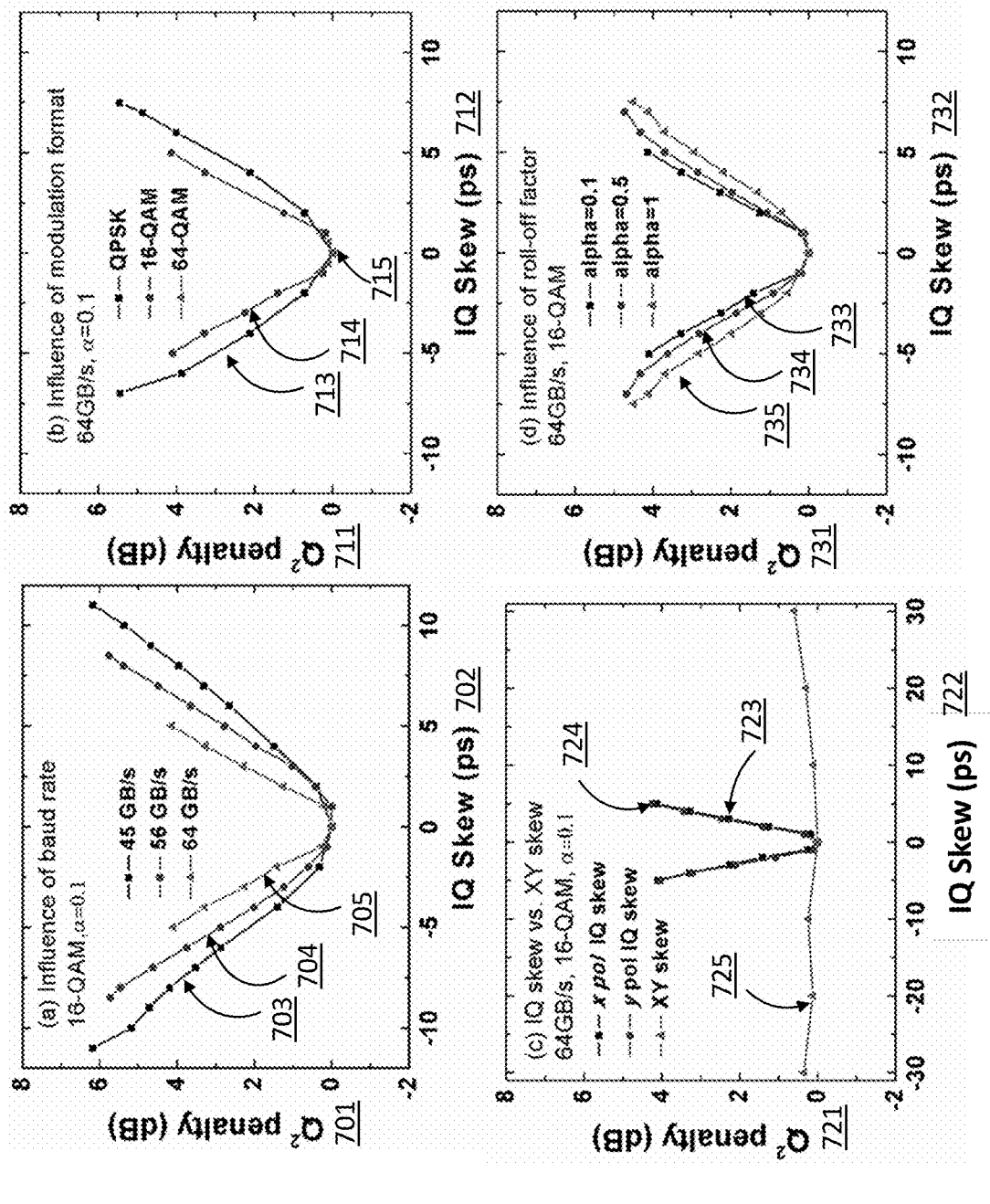

METHODS AND APPARATUS FOR IMPROVING THE SKEW TOLERANCE OF A COHERENT OPTICAL TRANSPONDER IN AN OPTICAL COMMUNICATION SYSTEM

CROSS-REFERENCE TO RELATED APPLICATION

This application is a continuation of U.S. patent application Ser. No. 15/970,485, now U.S. Pat. No. 10,547,408, filed on May 3, 2018, and entitled "Methods and Apparatus for Improving the Skew Tolerance of a Coherent Optical Transponder in an Optical Communication System," the disclosure of which is incorporated herein by reference in its entirety.

BACKGROUND

Some embodiments described herein relate generally to methods and apparatus for improving the performance of a coherent optical transponder in an optical communication system. In particular, but not by way of limitation, some embodiments described herein relate to methods and apparatus for improving the skew tolerance of a coherent optical transponder in an optical communication system.

With a growing demand of optical communication systems with high data rates capability, optical quadrature amplitude modulation (QAM) signals are generated to provide high data-carrying capacity and high spectral efficiency. Quadrature amplitude modulation (QAM) is a modulation technique where two or more binary or multi-level electrical data signals are modulated, via an in-phase, or "I" channel, and a quadrature (90 degree) phase, or "Q" channel, onto a single optical carrier wave such that both the amplitude and the phase of the optical carrier wave are modulated with data to enhance the efficiency of the spectral occupancy. Other modulation techniques include binary phase-shift keying (BPSK), quadrature phase-shift keying (QPSK), differential quadrature phase-shift keying (DQPSK), and on-off keying (OOK). Polarization multiplexing (PM) is a multiplexing technique where two independent electrical data signals are first modulated onto an optical carrier wave having orthogonal polarizations (e.g., a first electrical data signal is modulated onto an X channel polarization and a second electrical data signal is modulated onto a Y channel polarization), then the signal on two polarizations are further multiplexed together through a polarization beam combiner so that the overall data throughput is doubled without doubling the spectral bandwidth.

A typical dual-polarization QAM (DP-QAM) transponder includes four tributary channels, XI, XQ, YI, and YQ, which are used for in-phase and quadrature modulation for both an X channel polarization and a Y channel polarization. During propagation of an electrical signal (e.g., a DP-QAM signal, a DP-QPSK signal, and/or the like) and due to material defects of each optical modulator (and other factors such as temperature change, material deterioration over time), a skew may occur between the I channels of the electrical signal and the Q channels of the electrical signal (e.g., between the XI and XQ channels and/or between the YI and YQ channels; collectively referred to as an IQ skew). When uncompensated (e.g., when the optical signal remains skewed), the IQ skew may degrade network performance for a high data rate optical communication system (e.g., a 400 gigabit per second (Gb/s) system).

Known solutions include compensating the IQ skew during an initial calibration of an optical transponder by using a test data pattern. These solutions, however, rely on the specific test data pattern and cannot be implemented with live traffic. As the live traffic often differ from the test data pattern and the IQ skew varies over a change in temperature and time, a need exists for methods and apparatus to compensate the IQ skew accurately with live traffic and improve the tolerance of the IQ skew in the optical communication system.

SUMMARY

In some embodiments, an apparatus includes a memory and a processor operatively coupled to the memory. The processor is configured to be operatively coupled to a first optical transponder and a second optical transponder. The processor is configured to receive, from the second optical transponder, a first signal representing skew value of an optical signal and a second signal representing a bit-error-rate (BER) value of the optical signal. The optical signal is transmitted from the first optical transponder and received at the second optical transponder. The skew value is associated with a skew between an in-phase component of the optical signal and a quadrature component of the optical signal. The processor is configured to determine, based on at least one of the skew value or the BER value, if a performance degradation of the first optical transponder satisfies a threshold. The processor is configured to send a control signal to the first optical transponder to adjust, based on the performance degradation, a spectral shape of the first optical transponder, a data baud rate of the first optical transponder, or a channel spacing between adjacent channels of the first optical transponder.

BRIEF DESCRIPTION OF THE DRAWINGS

FIGS. 3A-3B are graphs illustrating a theoretical analysis of a dynamic adjustment of the roll-off factor $\alpha$ to improve skew tolerance of an optical transponder, according to an embodiment.

FIGS. 4A-4C show simulated eye diagrams with 16-QAM signal passing through a root raised cosine Nyquist filter at various roll-off factors, according to an embodiment.

FIGS. 6A-6D show simulated eye diagrams of an optical transponder (for example, 400 G, 64 GB/s, 16QAM) with an IQ skew of 4 ps, according to an embodiment.

FIGS. 7A-7D show the measured penalty of $Q^2$ factor as a function of an IQ skew of an optical transponder, according to an embodiment.

DETAILED DESCRIPTION

Figure 1:
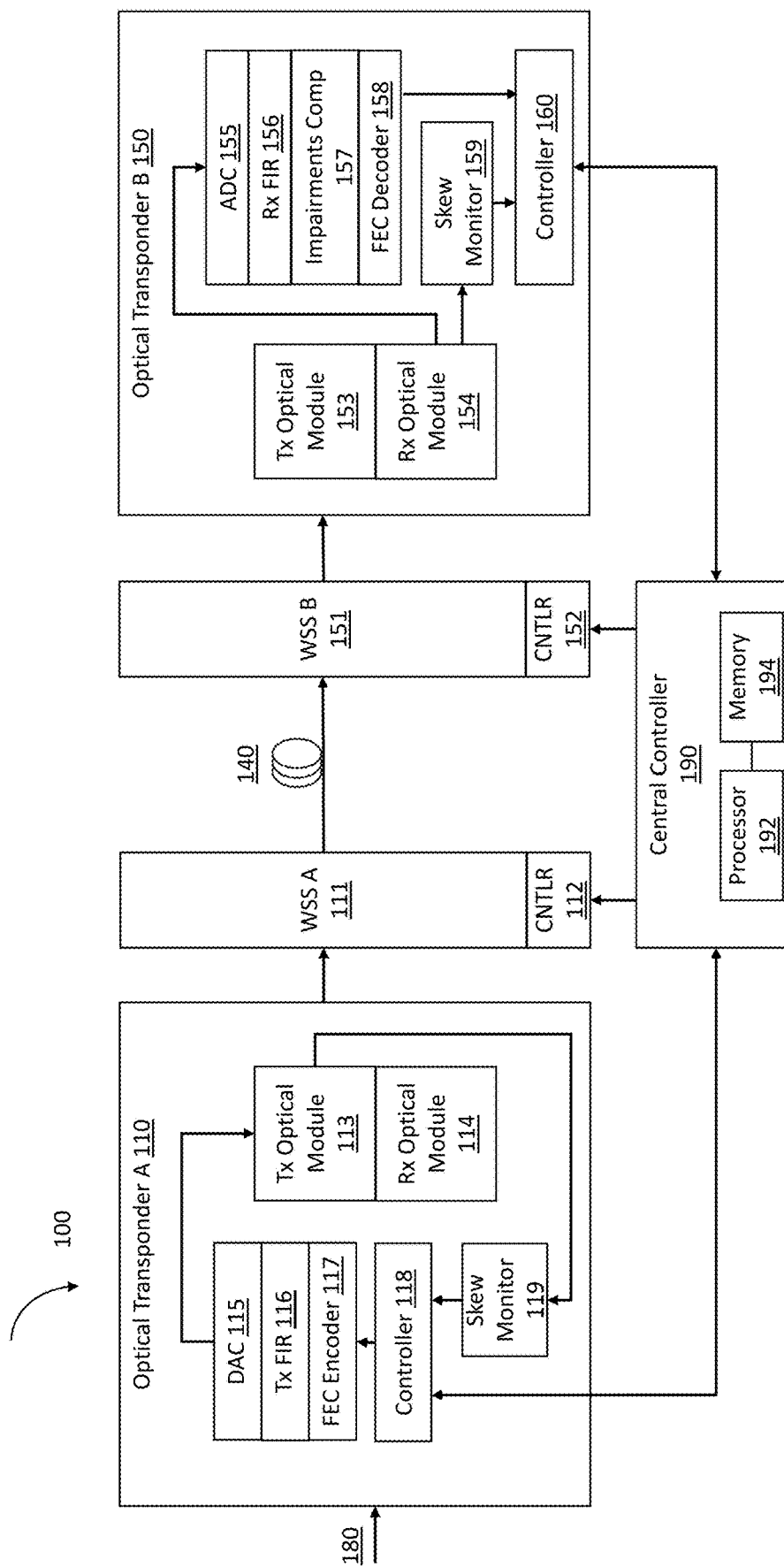
FIG. 1 is a block diagram illustrating an optical communication system, according to an embodiment.

Polarization multiplexing (PM) is a modulation technique where an optical carrier wave may have different optical polarizations that are independently and simultaneously modulated via electrical signals (e.g., information and/or data). The different polarizations may include a first polarization channel, "X channel," and a second polarization channel, "Y channel," and the X channel and the Y channel may be orthogonal (or approximately orthogonal) to one another. For example, the X channel may be horizontally polarized light, and the Y channel may be vertically polarized light. In some instances, the X and Y channels need not be horizontal and vertical polarizations, and need not be orthogonal.

Quadrature amplitude modulation (QAM) is a modulation technique where two or more binary or multi-level electrical data signals are modulated, via an in-phase, or "I" channel, and a quadrature (90 degree or approximately 90 degree) phase, or "Q" channel, onto a single optical carrier wave such that both its amplitude and phase are modulated with data to enhance the efficiency of the spectral occupancy. In M-ary QAM (mQAM or M-QAM), one symbol may represent multiple bits to enhance spectral efficiency. Other modulation techniques include binary phase-shift keying (BPSK), quadrature phase-shift keying (QPSK), differential quadrature phase-shift keying (DQPSK), and on-off keying (OOK).

An optical modulator may use polarization multiplexing to combine two different QAM signals into a dual-polarization QAM (DP-QAM) signal with an in-phase horizontal polarization, or "XI" channel, a quadrature horizontal polarization, or "XQ" channel, an in-phase vertical polarization, or "YI" channel, and a quadrature vertical polarization, or "YQ" channel, thereby improving spectral efficiency relative to a single QAM signal. Similarly, an optical modulator may use polarization multiplexing to combine two different QPSK signals into a dual-polarization QPSK (DP-QPSK), thereby improving spectral efficiency relative to a single QPSK signal.

During propagation of an electrical signal (e.g., a DP-QAM signal, a DP-QPSK signal, and/or the like), however, a skew may occur between the I channels of the electrical signal (e.g., the XI channel and the YI channel) and the Q channels of the electrical signal (e.g., the XQ and YQ channels) due to a change in temperature, deteriorating with time, and/or the like. A skew is generated in the electrical domain due to the difference of trace lengths on a print circuit board (PCB). A skew between the I channels of the electrical signal and the Q channels of the electrical signal is referred herein to as an IQ skew (or residual IQ skew). A skew between the X channels of the electrical signal and the Y channels of the electrical signal is referred herein to as a XY skew. When the electrical signal is modulated into an optical signal through the optical modulator, the skew in the electrical signal is transformed into the skew in optical signal. A skew may refer to a time misalignment between two or more channels. For example, a first channel may be misaligned to a second channel by a particular period of time (e.g., 1 picosecond (ps), 10 ps, 100 ps, etc.), resulting in a symbol of the first channel arriving at an optical receiver at a different time than a symbol of the second channel. When uncompensated (e.g., when the optical signal remains skewed), the IQ skew may degrade network performance for a high data rate optical communication system (e.g., a 400 gigabit per second (Gb/s) system).

Known solutions include compensating the IQ skew during an initial calibration of an optical transponder by using a test data pattern. These solutions, however, rely on the specific test data pattern and cannot be implemented with live traffic. As the live traffic often differs from the test data pattern and the IQ skew varies over a change in temperature and time, a need exists for methods and apparatus to compensate the IQ skew accurately with live traffic and improve the tolerance of the IQ skew in the optical communication system.

Pulse shaping is a process of changing a waveform of a transmitted signal to reduce intersymbol interference ("ISI"). The ISI is a distortion of a signal in which one symbol interferes with subsequent symbols, causing a signal receiver's failure to reliably distinguish between individual symbols. In some instances, pulse shaping can be achieved by using transmitter filters and/or receiver filters. An ideal Nyquist filter can be a brick-wall Nyquist filter (i.e., rectangular shape in a frequency domain). Such a filter produces a Nyquist filtered stream of symbols that is free of ISI when the symbol rate is less than or equal to the Nyquist frequency. In practice, however, a brick-wall Nyquist filter cannot be achieved because the response of an ideal Nyquist filter continues for all time. In practice, the filter characteristics of a brick-wall Nyquist filter can be approximated with a raised cosine filter. The time response of a raised cosine filter falls off much faster than the time response of a Nyquist pulse. Such filters produce a filtered stream of symbols that is free of ISI when the symbol rate is less than or equal to the Nyquist frequency. Some ISI can be introduced when the stream of symbols is detected across a channel. In some instances, the filter characteristics of a brick-wall Nyquist filter can also be approximated with a root raised cosine filter. In such instances, each of the transmitter FIR and the receiver FIR can implement the root raised cosine filter. Two root raised cosine filters have the same frequency response as one raised cosine filter, which satisfies the specification to minimize the ISI. The benefit of the root raised cosine filter is that, for example, the transmitter FIR and the receiver FIR have the matched filters. This can reduce the ISI and improve the bit-error-rate (BER).

The parameter controlling the bandwidth of the raised cosine Nyquist filter is the roll-off factor $\alpha$. The roll-off factor $\alpha$ is one ($\alpha=1$) if the ideal low pass filter bandwidth is doubled, that is the stopband goes to zero at twice the bandwidth ($2f_N$) of an ideal brick wall filter at $f_N$. If a is 0.5, a total bandwidth of $1.5f_N$ would result, and so on. On the one hand, the lower the value of the roll-off factor $\alpha$, the more compact the spectrum becomes but the longer time it takes for the impulse response to decay to zero, and thus the lower the system's tolerance to skew. On the other hand, the greater the value of the roll-off factor $\alpha$, the stronger the channel crosstalk. Thus, the channel spacing (ChSp) between adjacent optical channels is increased to minimize crosstalk, which, however, reduces spectral efficiency. In addition to the channel spacing (ChSp) and the bandwidth of the optical receiver (RxBw) and the length of adaptive equalizer in the Digital Signal Processing (EqLn) can be adjusted based on roll-off factor $\alpha$ as well. The adaptive equalizer of an optical receiver equalizes waveform distortion caused by bandwidth limitation, polarization mode dispersion ("PMD"), and/or the like. The compensation for waveform distortion and adaptive equalization with respect to time-varying propagation characteristic of optical transmission paths can be realized using a digital signal processor. As a result, the performance of the optical communication system can be improved. Embodiments described herein include methods and apparatus to determine an optimization between the roll-off factor and the spectral efficiency (e.g., ChSp, RxBw, EqLn, and/or the like) to improve the tolerance of the IQ skew.

Some embodiments described herein include an apparatus having a memory and a processor operatively coupled to the memory. The processor is configured to be operatively coupled to a first optical transponder and a second optical transponder. The processor is configured to receive, from the second optical transponder, a signal representing a skew value of an optical signal and a signal representing a bit-error-rate (BER) value of the optical signal. The optical signal is transmitted from the first optical transponder and received at the second optical transponder. The skew value is associated with a skew between an in-phase component of the optical signal and a quadrature component of the optical signal. The processor is configured to determine, based on at least one of the skew value or the BER value, if a performance degradation of the first optical transponder satisfies a threshold. The processor is configured to send a control signal to the first optical transponder to adjust, based on the performance degradation, at least one of a pulse shaping of the first optical transponder or a data baud rate of the first optical transponder.

As used in this specification, the singular forms "a," "an" and "the" include plural referents unless the context clearly dictates otherwise. Thus, for example, the term "an optical modulator" is intended to mean a single optical modulator or multiple optical modulators. For another example, the term "a control signal" is intended to mean a single control signal or multiple control signals.

FIG. 1 is a block diagram illustrating an optical communication system, according to an embodiment. The optical communication system 100 can be configured to produce, transmit, and/or receive optical signals. For example, the optical communication system 100 can be a wavelength division multiplexing (WDM) system, including a dense wavelength division multiplexing (DWDM) system. The optical communication system 100 can include an optical transponder A 110, an optical transponder B 150, a wavelength selective switch (WSS) A 111, a wavelength selective switch (WSS) B 151, a central controller 190, an optical link 140, and one or more optical devices (not shown in the figure). Each component (or device) of the optical communication system 100 can be configured to be operatively coupled to the other component (or device) of the optical communication system 100.

The optical transponder A 110 can be operatively coupled to the central controller 190 and the WSS A 111 and configured to produce, transmit and/or receive an optical signal. The optical transponder A 110 is, in some embodiments described herein, referred to as an optical transmitter. The optical transponder A 110 can be a hardware module in the optical communication system 100. The optical transponder A 110 can be any high data rate (e.g., 100 Gbps) optical transponder such as a transponder implementing intensity modulation with direct detection, e.g., a coherent optical transponder, a coherent optical M-ary quadrature amplitude modulation (M-QAM) transponder, a coherent polarization-multiplexed (PM) M-QAM transponder, and/or the like. In coherent optical communication systems with a coherent optical transponder, both magnitude and phase information are used to transmit and receive data such as for phase-shift keying modulation (e.g., BPSK, PM-BPSK, QPSK, PM-QPSK) or quadrature amplitude modulation (e.g., M-QAM, or PM-M-QAM). For example, the optical transponder A 110 may include a laser diode, a semiconductor laser, a continuous wave laser, and/or an optical modulator that may receive an electrical signal, and modulate, based on the electrical signal, an optical signal for transmission over optical link 140.

The optical transponder A 110 can be a hardware module in the optical communication system 100 and can include a transmitter (Tx) optical module 113, a receiver (Rx) optical module 114, and a set of electrical components including, but are not limited to, a digital-analog converter (DAC) 115, a transmitter (Tx) finite impulse response (FIR) 116, a forward error correction (FEC) encoder 117, a controller 118, and a skew monitor 119. One or more components of the optical transponder A 110 can be implemented using free-space optics, fiber optics, integrated optics (e.g., Si, SiN, Silica, III-V, etc. optics), or the like. Each component of the optical transponder A 110 can be operatively coupled to another component of optical transponder A 110.

The controller 118 can be or can include a general purpose processor, a field-programmable gate array (FPGA), an application specific integrated circuit (ASIC), a combination thereof, or other equivalent integrated or discrete logic circuitry. The controller 118 can include a processor, and a memory. In some implementations, the controller 118 can include components and/or circuitry configured to control properties of an optical signal and/or send control signals to one or more components of the optical transponder A 110. For example, the controller 118 can send control signals to and thus control properties of one or more electrical components (e.g., DAC 115, the Tx FIR 116, the FEC Encoder 117) and/or one or more components within the Tx optical module 113 and/or the Rx optical module 114. In some implementations, the controller 118 can receive, from the optical transponder B 150, a signal representing an IQ skew value and a signal representing the BER value of an optical signal. The controller 118 can generate and send control signals to adjust the data baud rate, the roll-off factor of the Tx FIR filter 116, and the wavelength of a transmitter channel at the optical transponder A 110. In some implementations, controller 118 is a hardware device and/or software (executed on a processor) external to the optical transponder A 110. In other implementations, controller 118 is a hardware device and/or software (executed on a processor) implemented within the optical transponder A 110.

In some implementations, the DAC 115, the Tx FIR 116, and the FEC encoder 117 can be included in a digital signal processor (DSP) (not shown in the figure). The DSP can be or can include a general purpose processor, a field-programmable gate array (FPGA), an application specific integrated circuit (ASIC), a Digital Signal Processing (DSP) chip, a combination thereof, or other equivalent integrated or discrete logic circuitry. The DSP can perform signal processing such as spectral shaping, equalizing for optical and electrical impairments, and other such signal processing for various needs. The DSP can receive control signals from controller 118 and send electrical signals to the Tx optical module 113. In some implementations, the DSP can be a hardware device external to the Tx optical module 113. In other implementations, the DSP can be a hardware device within the Tx optical module 113.

The FEC encoder 117 can be or include a general purpose processor, a field-programmable gate array (FPGA), an application specific integrated circuit (ASIC), a combination thereof, or other equivalent integrated or discrete logic circuitry. The FEC encoder 117 can be configured to correct errors in data transmission over unreliable or noisy communication channels (such as optical link 140 in FIG. 1) to improve data reliability. The FEC encoder 117 can receive electrical data signals as input (180) from an electrical circuit (e.g., a network processor located upstream) (not shown in the figure). The FEC encoder 117 can then encode the data signals with redundant error-correction information (e.g., redundant parity symbols), and ultimately send the encoded data signals to an optical receiver (such as optical transponder B 150 in FIG. 1). Based on the redundant error-correction information, the optical receiver can then detect and correct errors that occur during the data transmission. Specifically, for example, the FEC encoder 117 can receive a set of electrical signals (having data signals and/or data packets) from an electrical interface (not shown) of the optical transponder A 110 (or from a controller 118), and encode the set of electrical signals based on a pre-determined algorithm. The FEC encoder 117 can generate FEC overhead bits and add the FEC overhead bits to a payload of an electrical signal. The FEC overhead bits are encoded such that the optical transponder B 150 (or the FEC decoder 158 in the optical transponder B 150) can use the information within the FEC overhead bits to detect and correct bit errors in the payload of the electrical signal received by the optical transponder B 150 after converting the related optical signal. Bit errors may be incurred in the transmission path (e.g., the Tx optical module 113 of the optical transponders A 110, the WSS A 111, the WSS B 151, the Rx optical module 154 of the optical transponder B 150, and/or the optical links 140) between the optical transponder A 110 and optical transponder B 150.

The Tx FIR filter 116 is a digital filter that uses a digital signal processing technique. The Tx FIR filter 116 can have an impulse response that is of finite duration, because it settles to zero in finite time. The Tx FIR filter 116 can receive signals from the FEC encoder 117 and send an output signal to DAC 115. The output signal from the Tx FIR filter 116 can be expressed as:

$$y(n) = \sum_{j=1}^{N} FIR_j * x(n-j), x \in \{-1, +1\} \quad (1)$$

Where $FIR_j$ is the coefficient of the $j^{th}$ tap which is, in some implementations, a signed integer. N is the total number of taps. When $FIR_j$ has the same sign as $x(n-j)$, all terms in equation (1) can add together constructively. The maximum output from the Tx FIR filter 116 can be $$\sum_{j=1}^{N} |FIR_j|.$$

Pulse shaping is a process of changing a waveform of a transmitted signal to reduce intersymbol interference ("ISI"). The ISI is a distortion of a signal in which one symbol interferes with subsequent symbols, causing a signal receiver's failure to reliably distinguish between individual symbols. In some instances, pulse shaping can be achieved by using transmitter filters (e.g., Tx FIR 116) and/or receiver filters (e.g., Rx FIR 156). A Tx FIR filter 116 can be, for example, a Nyquist filter. An ideal Nyquist filter can be a brick-wall Nyquist filter (i.e., rectangular shape in a frequency domain). Such a filter produces a Nyquist filtered stream of symbols that is free of ISI when the symbol rate is less than or equal to the Nyquist frequency. In practice, however, a brick-wall Nyquist filter cannot be achieved because the response of an ideal Nyquist filter continues for all time. In practice, the filter characteristics of a brick-wall Nyquist filter can be approximated with a raised cosine filter. The time response of a raised cosine filter falls off much faster than the time response of a Nyquist pulse. Such filters produce a filtered stream of symbols that is free of ISI when the symbol rate is less than or equal to the Nyquist frequency. Some ISI can be introduced when the stream of symbols is detected across a channel. In some instances, the filter characteristics of a brick-wall Nyquist filter can also be approximated with a root raised cosine filter.

The parameter controlling the bandwidth of the raised cosine Nyquist filter is the roll-off factor α. The roll-off factor α is one (α=1) if the ideal low pass filter bandwidth is doubled, that is the stopband goes to zero at twice the bandwidth ($2f_N$) of an ideal brick wall filter at $f_N$. If α is 0.5, a total bandwidth of $1.5f_N$ would result, and so on. On the one hand, the lower the value of the roll-off factor α, the more compact the spectrum becomes but the longer time it takes for the impulse response to decay to zero, and thus the lower the system's tolerance to skew. On the other hand, the greater the value of the roll-off factor α, the stronger the channel crosstalk.

The DAC 115 can receive signals from the Tx FIR filter 116 and convert those signals to analog electrical signals. The analog electrical signals can then be sent to the Tx optical module 113. In some implementations, the maximum output from the DAC 115 can be $$\sum_{j=1}^{N} |FIR_j| / (2^{\wedge} Bit_{DAC}) * V_{DAC}^i,$$

where $Bit_{DAC}$ is the number of bits for a high speed DAC, and $V_{DAC}$ is the maximum output voltage for a high speed DAC. In some implementations, the output from the DAC 115 can be further sent through a pluggable connector (not shown), and/or a radio frequency (RF) trace (not shown), and ultimately to a RF amplifier (not shown).

In some implementations, the optical transponder A 110 can include a skew monitor 119 configured to measure and monitor the skew between the XI channel, the XQ channel, the YI channel, and the YQ channel of the optical signal output from the Tx optical module 113. The skew monitor 119 can measure a time misalignment and/or a power difference (e.g., via a power meter) between two or more channels. The skew monitor 119 can output a signal representing the measured skew value between two or more channels to the controller 118, and the controller 118 can send control signals to the FEC encoder 117, the Tx FIR 116, the DAC 115, and/or other electronic or optical components in the optical transponder A 110 to compensate the skew between the two or more channels. In some implementations, the IQ skew can be measured during the initial power-up of the optical transponder A 110 and compensated accordingly. In such implementations, the destructive interference using BPSK data pattern, the cooperative coevolution genetic algorithm having the modified clock tone amplitude as the fitness function, or the analysis of the image spectrum can be used to facilitate the IQ skew measurement. In other implementations, the IQ skew can be measured by the digital signal processing (DSP) of an optical receiver (such as the optical transponder B 150). In such implementations, the complex 4×2 multi-in multi-out (MIMO) adaptive equalizer, the frequency domain estimation and the time domain compensation, the widely linear equalization, or the extra 2×2 butterfly adaptive equalizer specifically for transmitter impairment compensation can be used to facilitate the IQ skew measurement.

The Tx optical module 113 can receive electrical signals (i.e., data signals) from the DAC 115 and output an optical signal(s) to the WSS A 111. The Tx optical module 113 can include an optical source (not shown) and a Mach-Zehnder Modulator ("Modulator" or "MZM") (not shown). In some implementations, the MZM (not shown) can modulate an optical signal output from the optical source (not shown) with the electrical signals received from the DAC 115 to produce modulated optical signals. The Tx optical module 113 can output the modulated optical signals to the WSS A 111. Details of the Tx optical module 113 are described with respect to FIG. 2.

The Rx optical module 114 can receive an optical signal from the optical transponder B 150 via the optical link 140. For example, the Rx optical module 114 can include a photodetector and/or a photodiode that can detect an optical signal received via optical link 140, and can convert the optical signal into an electrical signal. In some implementations, the Rx optical module 114 can include a device capable of de-modulating an optical signal. In some implementations, the Rx optical module 114 can include a device capable of controlling properties associated with an optical signal and/or a de-modulator. The Rx optical module 114 can be operatively coupled to the controller 118, the skew monitor 119, an analog-to-digital converter (ADC, not shown), a receiving finite impulse filter (Rx FIR, not shown), an FEC decoder (not shown), and/or a digital signal processor (DSP, not shown).

The wavelength selective switch ("WSS") A 111 can dynamically route, block and attenuate optical signals within a network node. The optical signal can be a multiplexed optical signal having a set of wavelengths (e.g., a DWDM optical signal) or an optical signal having a single wavelength. A 1×N WSS includes a single common input port (not shown in the figure) and N opposing multi-wavelength output ports (not shown in the figure) where each optical signal (having a wavelength from the set of wavelengths) input from the common input port can be switched (or routed) to any one of the N multi-wavelength output ports, independent of how all other wavelength channels are routed. Each of the N multi-wavelength output ports can be coupled to a corresponding optical fiber associated with the optical link 140 to transmit the optical signal. This wavelength switching (routing) process can be dynamically managed and controlled through an electronic communication control interface (e.g., controller 112) on the WSS A 111. The WSS A 111 can be implemented using, for example, Micro Electro Mechanical Systems (MEMS) technologies, liquid crystal technologies, liquid crystal on silicon (LCoS) technologies, and/or the like. The WSS A 111 can include a beam splitter, a beam combiner, interferometric switches, digital optical switches, and/or the like.

The controller 112 can be an internal component within the WSS A 111, or a component external to and coupled to the WSS A 111. The controller 112 can be or can include a general purpose processor, a field-programmable gate array (FPGA), an application specific integrated circuit (ASIC), a combination thereof, or other equivalent integrated or discrete logic circuity. The controller 112 can include a processor and a memory. In some implementations, the controller 112 can include components and/or circuitry configured to send control signals to one or more components of the WSS A 111 to change the wavelength switching (routing process) of the WSS A 111. In some implementations, the controller 112 can receive control signals from the central controller 190 and send control signals to the WSS A 111 to change the wavelength switching (routing process) of the WSS A 111.

Optical link 140 can include a medium capable of carrying optical signals. For example, optical link 140 can include an optical fiber(s) that couples together optical transponder A, WSS A 111, WSS B 151, and optical transponder B 150. The optical link 140 can be included within an optical network that includes other optical links and optical devices.

The WSS B 151 can be structurally and functional similar to the WSS A 111. The wavelength selective switch ("WSS") B 151 can dynamically route, block and attenuate optical signals within a network node. This wavelength switching (routing) process can be dynamically managed and controlled through an electronic communication control interface (e.g., controller 152) on the WSS B 151. The WSS B 151 can be implemented using, for example, Micro Electro Mechanical Systems (MEMS) technologies, liquid crystal technologies, liquid crystal on silicon (LCoS) technologies, and/or the like. The WSS B 151 can include a beam splitter, a beam combiner, interferometric switches, digital optical switches, and/or the like.

The controller 152 can be structurally and functional similar to the controller 112. The controller 152 can be an internal component within the WSS B 151, or a component external to and coupled to the WSS B 151. The controller 152 can be or can include a general purpose processor, a field-programmable gate array (FPGA), an application specific integrated circuit (ASIC), a combination thereof, or other equivalent integrated or discrete logic circuity. The controller 152 can include a processor, and a memory. In some implementations, the controller 152 can include components and/or circuitry configured to send control signals to one or more components of the WSS B 151 to change the wavelength switching (routing process) of the WSS B 151. In some implementations, the controller 152 can receive control signals from the central controller 190 and send control signals to the WSS B 151 to change the wavelength switching (routing process) of the WSS B 151.

The optical transponder B 150 can be operatively coupled to the central controller 190 and the WSS B 151 and configured to produce, transmit and/or receive an optical signal(s). The optical transponder B 150 can be structurally and functional similar to the optical transponder A 110. The optical transponder B 150 is, in some embodiments described herein, referred to as an optical receiver. The optical transponder B 150 can be a hardware module in the optical communication system 100. The optical transponder B 150 can be any high data rate (e.g., 100 Gbps) optical transponder such as a transponder implementing intensity modulation with direct detection, e.g., a coherent optical transponder, a coherent optical M-ary quadrature amplitude modulation (M-QAM) transponder, a coherent polarization-multiplexed (PM) M-QAM transponder, and/or the like. In coherent optical communication systems with a coherent optical transponder, both magnitude and phase information are used to transmit and receive data such as for phase-shift keying modulation (e.g., BPSK, PM-BPSK, QPSK, PM-QPSK) or quadrature amplitude modulation (e.g., M-QAM, or PM-M-QAM).

The optical transponder B 150 can be a hardware module in the optical communication system 100 and can include a transmitter (Tx) optical module 153, a receiver (Rx) optical module 154, and a set of electrical components including, but are not limited to, an analog-to-digital converter (ADC) 155, a receiving (Rx) finite impulse response (FIR) 156, an impairment compensation component 157, a forward error correction (FEC) decoder 158, a controller 160, and a skew monitor 159. The optical transponder B 150 can be implemented using free-space optics, fiber optics, integrated optics (e.g., Si, SiN, Silica, III-V, etc. optics), or the like. Each component of the optical transponder B 150 can be operatively coupled to another component of optical transponder B 150.

The Tx optical module 153 can be functionally and structurally similar to the Tx optical module 113. The Tx optical module 153 can receive electrical signals (i.e., data signals) and transmit an optical signal(s).

The Rx optical module 154 can be functionally and structurally similar to the Rx optical module 154. The Rx optical module 154 can receive an optical signal from the optical transponder A 110 via the optical link 140. For example, the Rx optical module 154 can include a photodetector and/or a photodiode that can detect an optical signal received via optical link 140, and can convert the optical signal into an electrical signal. In some implementations, the Rx optical module 154 can include a device capable of de-modulating an optical signal. In some implementations, the Rx optical module 154 can include a device capable of controlling properties associated with an optical signal and/or a de-modulator.

The ADC 155 can receive the analog electrical signals from the Rx optical module 154 and convert those signals to digital electrical signals. The digital electrical signals can then be sent to the Rx FIR 156. The ADC 155 can be or can include a general purpose processor, a field-programmable gate array (FPGA), an application specific integrated circuit (ASIC), a combination thereof, or other equivalent integrated or discrete logic circuitry. The ADC 155 can also include a memory (e.g., a random-access memory (RAM) (e.g., a dynamic RAM, a static RAM), a flash memory, a removable memory, and/or so forth.)

The Rx FIR 156 can be structurally and functionally similar to the Tx FIR 116. The Rx FIR 156 is a digital filter that uses a digital signal processing technique. The Rx FIR 156 can have an impulse response that is of finite duration, because it settles to zero in finite time. The Rx FIR 156 can receive signals from the ADC 155 and send an output signal to the impairments compensation processor 157.

The impairments compensation processor 157 can compensate signal impairments occurred during the propagation of the optical signal from the optical transponder A 111 to the optical transponder B 151. In some implementations, the impairments compensation processor 157 can be included in a digital signal processing (DSP) chip within the optical transponder B 150. In some implementations, the impairments compensation processor 157 can compensate for the chromatic dispersion (CD), polarization mode dispersion (PMD) with first order PMD being differential group delay (DGD), and carrier frequency offset (CFO).

The FEC decoder 158 can be configured to correct bit errors in data transmission from the optical transponder A 110 over the transmission path (e.g., the Tx optical module 113 of the optical transponders A 110, the WSS A 111, the WSS B 151, the Rx optical module 154 of the optical transponder B 150, and/or the optical links 140) to improve data reliability. The FEC decoder 158 can be or can include a general purpose processor, a field-programmable gate array (FPGA), an application specific integrated circuit (ASIC), a combination thereof, or other equivalent integrated or discrete logic circuitry. The FEC decoder 158 can also include a memory (e.g., a random-access memory (RAM) (e.g., a dynamic RAM, a static RAM), a flash memory, a removable memory, and/or so forth.) The FEC decoder 158 can receive a set of electrical signals, each having a payload together with FEC overhead bits from the ADC 155, and detect and correct bit errors that have occurred over the transmission path, and recover the data information included in the set of electrical signals. In one implementation, the FEC encoder 117 and the FEC decoder 158 can implement quasi-cyclic low-density parity-check (QC-LDPC) codes.

The FEC decoder 158 can be configured to measure the bit error rate (BER), which represents the number of bit errors per unit time. In some instances, in addition to measuring the bit error rate, the FEC decoder 158 can be configured to measure the bit error ratio, which represents the number of bit errors divided by the total number of transferred bits during a time interval. The bit error rate or the bit error ratio can show a degree of errors that has occurred over the transmission path (e.g., the Tx optical module 113 of the optical transponders A 110, the WSS A 111, the WSS B 151, the Rx optical module 154 of the optical transponder B 150, and/or the optical links 140). The FEC decoder 158 can be configured to measure the BER value before or after the FEC decoder 158 corrects the bit errors. The FEC decoder 158 can send a signal representing the BER value to the controller 160 and the controller 160 can send control signals directly to the controller 118 of the optical transponder A 110 and/or to the central controller 190. The control signals are received by one or more electronic or optical components in the optical transponder A 110 to compensate the skew between the two or more channels of the XI channel, the XQ channel, the YI channel, and the YQ channel.

In some implementations, the ADC 155, the Rx FIR 156, the impairments compensation processor 157, and the FEC decoder 158 can be included in a digital signal processor (DSP) (not shown in the figure). The DSP at the optical transponder B 150 can be or can include a general purpose processor, a field-programmable gate array (FPGA), an application specific integrated circuit (ASIC), a Digital Signal Processing (DSP) chip, a combination thereof, or other equivalent integrated or discrete logic circuitry. The DSP can perform signal processing such as spectral shaping, equalizing for optical and electrical impairments, and other such signal processing for various needs. The DSP can send control signals from controller 160 and receive electrical signals from the Rx optical module 154. In some implementations, the DSP can be a hardware device external to the Rx optical module 154. In other implementations, the DSP can be a hardware device within the Rx optical module 154.

After coherent detection of an optical signal received at the optical transponder B 150 from the optical transponder A 110, a real-time DSP at the optical transponder B 150 can be used to de-multiplex X/Y polarizations, compensate the chromatic dispersion (CD) and the polarization mode dispersion (PMD), and track phase change and frequency offset. The DSP can receive control signals from the controller 160 or the central controller 190 to configure the parameters of the DSP.

In some implementations, the DSP at the optical transponder B 150 can include an adaptive equalizer (not shown) that equalizes waveform distortion caused by bandwidth limitation, polarization mode dispersion ("PMD"), and/or the like. The compensation for waveform distortion and adaptive equalization with respect to time-varying propagation characteristic of optical transmission paths can be realized using the DSP at the optical transponder B 150. As a result, the performance of the optical communication system 100 can be improved. The adaptive equalizer can be a time-domain equalizer or a frequency-domain equalizer. In some implementations, the length of adaptive equalizer in the DSP (EqLn) can be optimized based on the roll-off factor α of the Tx FIR filter 116.

In some implementations, the optical transponder B 150 can include a skew monitor 159 configured to measure and monitor the skew between the XI channel, the XQ channel, the YI channel, and the YQ channel of the optical signal(s) received at the Rx optical module 154 from the optical transponder A 110. The skew monitor 159 can measure a time misalignment and/or a power difference (e.g., via a power meter) between two or more channels. The skew monitor 159 can output the measured skew value between two or more channels to the controller 160 and the controller 160 can send control signals directly to the controller 118 of the optical transponder A 110 and/or to the central controller 190. The control signals are received by one or more electronic or optical components in the optical transponder A 110 to compensate the skew between the two or more channels of the XI channel, the XQ channel, the YI channel, and the YQ channel.

The controller 160 can be or can include a general purpose processor, a field-programmable gate array (FPGA), an application specific integrated circuit (ASIC), a combination thereof, or other equivalent integrated or discrete logic circuitry. The controller 160 can include a processor, and a memory. In some implementations, the controller 160 can include components and/or circuitry configured to control properties of an optical signal and/or send control signals to one or more components of the optical transponder B 150, one or more components of the optical transponder A 110, and/or the central controller 190. For example, the controller 118 can send control signals to and thus control properties of one or more electrical components (e.g., ADC 155, the Rx FIR 156, the impairments compensation processor 157, the FEC decoder 158, and/or the skew monitor 159) and/or one or more components within the Tx optical module 153 and/or the Rx optical module 154. In some implementations, controller 160 is a hardware device and/or software (executed on a processor) external to the optical transponder B 150. In other implementations, controller 118 is a hardware device and/or software (executed on a processor) implemented within the optical transponder B 150.

The central controller 190 is a hardware device and/or software (executed on a processor and/or stored in memory) operatively coupled to the optical transponder A 110 and the optical transponder B 150. The central controller 190 can include a processor 192 and a memory 194 operatively coupled to the processor 192. The processor 192 can be or include any processing device or component configured to perform the data collecting, processing and transmitting functions as described herein. The processor 192 can be configured to, for example, write data into and read data from the memory 194, and execute the instructions stored within the memory 194. Processor 192 can also be configured to execute and/or control, for example, the operations of the memory 194. In some implementations, based on the methods or processes stored within the memory 194, the processor 192 can be configured to execute the baud rate dynamic control process, as described in FIG. 12, and the channel spacing dynamic control process, as described in FIG. 13. Furthermore, the dynamic pulse shaping control process as described in FIGS. 12 and 13 can be executed to improve the tolerance to IQ skew.

In some implementations, the central controller 190 can receive, from the optical transponder B 150, a signal representing an IQ skew value and a signal representing the BER value of an optical signal. The controller 190 can generate and send control signals to adjust the data baud rate, the pulse shaping including the roll-off factor of the Tx FIR filter 116, and/or the wavelength of a transmitter channel at the optical transponder A 110. In these implementations, the central controller 190 can receive and/or send signals from/to the optical transponder A 110 and/or the optical transponder B 150. In these implementations, the controller 118 and the controller 160 can be omitted.

In some instances, the controller 118 can receive a signal representing the skew value of the optical signal from the skew monitor 159 and receive a signal representing the BER value of the optical signal from the FEC decoder 158. In some instances, the controller 118 can receive a signal representing the skew value of the optical signal and a signal representing BER value of the optical signal from the controller 160. In these instances, the controller 118 can generate and send control signals to adjust the data baud rate, the pulse shaping including the roll-off factor of the Tx FIR filter 116, and/or the wavelength of a transmitter channel at the optical transponder A 110.

The memory 194 can be, for example, a random-access memory (RAM) (e.g., a dynamic RAM, a static RAM), a flash memory, a removable memory, and/or so forth. In some embodiments, the memory 194 can include, for example, a database, process, application, virtual machine, and/or some other software modules (stored and/or executing in hardware) or hardware modules configured to execute a baud rate dynamic control process and a channel spacing dynamic control process as described further herein. In such implementations, instructions of executing the baud rate dynamic control process and the channel spacing dynamic control process and/or the associated methods can be stored within the memory 194 and executed at the processor 192.

The number and arrangement of devices shown in FIG. 1 are provided as an example. In some embodiments, there may be additional devices, fewer devices, different devices, or differently arranged devices than those shown in FIG. 1. For example, the optical communication system 100 can include one or more optical devices (not shown in the figure). Specifically, the optical communication system 100 can include one or more optical traffic processing and/or optical traffic transfer devices, such as an optical node, an optical add-drop multiplexer ("OADM"), a reconfigurable optical add-drop multiplexer ("ROADM"), an optical multiplexer, an optical demultiplexer, an optical transmitter, an optical receiver, an optical transceiver, a photonic integrated circuit, an integrated optical circuit, a wavelength selective switch, a free space optics device, and/or another type of device capable of processing and/or transferring optical traffic. Furthermore, two or more devices shown in FIG. 1 may be implemented within a single device, or a single device shown in FIG. 1 may be implemented as multiple, distributed devices.

In use, many parameters of the optical communication system can be adjusted to improve the system performance of the optical communication system 100. These parameters include, but are not limited to, for example, the modulation format of an individual channel of an optical transmitter (i.e., the optical transponder A 110), the roll-off factor α of the FIR filter 116 (e.g., Nyquist filter) for an individual channel of the optical transmitter (i.e., the optical transponder A 110), and/or the baud rate of an individual channel of an optical transmitter (i.e., the optical transponder A 110). Other parameters that can be adjusted to improve the system performance of the optical communication system 100 include, but are not limited to, for example, the channel spacing between adjacent channels (ChSp) of the optical transmitter (i.e., the optical transponder A 110) or the optical receiver (i.e., the optical transponder B 150), the bandwidth of the optical receiver (RxBw) (i.e., the optical transponder B 150), and/or the length of adaptive equalizer in the Digital Signal Processing (EqLn) of the optical receiver (i.e., the optical transponder B 150).

Stated similarly, for an optical transmitter (i.e., the optical transponder A 110), parameters of each channel, including, for example, the modulation format, the baud rate, the roll-off factor, the wavelength, and/or the like, can be dynamically adjusted. For an optical receiver (i.e., the optical transponder B 150), the wavelength (of, for example, the local oscillator), the receiver bandwidth (RxBw), and the DSP algorithms (e.g., the length of the adaptive equalizer EqLn) can be dynamically configured and adaptively tuned based on, for example, the status of the optical transmitter (i.e., the optical transponder A 110), the status of components (or devices) along the propagation path of an optical signal in the optical communication system 100, and/or material defects of each optical modulator (and other factors such as temperature change, or material deterioration over time).

In some implementations, the central controller 190 (or the controller 118 of the optical transponder A 110) can receive, from the optical transponder B 150, a signal representing a skew value of a first optical signal and a signal representing a bit-error rate (BER) value of a first optical signal. The skew value (i.e., IQ skew) of the first optical signal is the time misalignment between the I channels of the first optical signal and the Q channels of the first optical signal (e.g., between the XI and XQ channels and/or between the YI and YQ channels. The skew value is measured by the skew monitor 159 of the optical transponder B 150. The first optical signal is received at the optical transponder B 150 from the optical transponder A 110 over the optical links 140. The FEC decoder 158 can measure the BER value of the first optical signal, which represents the number of bit errors per unit time. The BER value shows a degree of errors that has occurred over the transmission path between the optical transponder A 110 and the optical transponder B 150.

The central controller 190 (or the controller 118 of the optical transponder A 110) can determine if the skew value of the first optical signal satisfies a first threshold. The skew value of the first optical signal satisfies the first threshold when the IQ skew of the first optical signal is greater than the first threshold, indicating that the performance of the optical communication system degrades and is below a defined criteria (indicating the performance is unacceptable). The skew value of the first optical signal does not satisfy the first threshold when the IQ skew of the first optical signal is less than the first threshold, indicating that the performance of the optical communication system 100 is above the defined criteria and the performance degradation is small (or acceptable).

In response to the skew value of the first optical signal not satisfying the first threshold, the skew monitor 159 can monitor the IQ skew of a second optical signal received at the optical transponder B 150 from the optical transponder A 110 over the transmission paths. The central controller 190 (or the controller 118 of the optical transponder A 110) can determine if the BER value of the first optical signal satisfies a second threshold. The BER value of the first optical signal satisfies the second threshold when the BER of the first optical signal is greater than the second threshold, indicating that the performance of the optical communication system 100 degrades and is below a defined criteria (indicating the performance is unacceptable). The BER value of the first optical signal does not satisfy the second threshold when the BER of the first optical signal is less than the second threshold, indicating that the performance of the optical communication system 100 is above the defined criteria and the performance degradation is small (or acceptable). When the BER value of the first optical signal does not satisfy the second threshold, the BER of the second optical signal can be monitored.

In response to the skew value of the first optical signal satisfying the first threshold, and in response to the BER value of the first optical signal satisfying the second threshold, the central controller 190 (or the controller 118 of the optical transponder A 110) can send a control signal to adjust, based on at least one of the skew value and the BER value (or based on the performance degradation), a data baud rate of the optical transponder A 110. The performance of the optical communication system 100 can be improved (and the IQ skew decreases, and the BER value decreases) in regards to the tolerance to IQ skew when the data baud rate of the optical transponder A 110 is reduced.

In response to the data baud rate of the optical transponder A 110 being reduced, the central controller 190 (or the controller 118 of the optical transponder A 110) can determine if the BER value of a second optical signal satisfies a third threshold. In other words, the central controller 190 (or the controller 118 of the optical transponder A 110) can determine if the performance of the optical communication system 100 improves in response to the reduction in the data baud rate of the optical transponder A 110. The third threshold can be the same as or different from the second threshold.

In response to the BER value of the second optical signal not satisfying the third threshold, the central controller 190 (or the controller 118 of the optical transponder A 110) can adjust, based on at least one of the skew value and the BER value (or based on the performance degradation), the pulse shaping including the roll-off factor of a transmitting (Tx) finite impulse response ("FIR") filter 116 (e.g., a Nyquist filter) of the optical transponder A 110. In response to the data baud rate of the optical transponder A 110 being reduced, the channel spacing between the adjacent channels increases, while the central wavelength of each channel remains the same. Thus, the roll-off factor of the Tx FIR filter 116 can be increased. Meanwhile, the spectral efficiency of the optical communication system 100 slightly decreases.

In response to the data baud rate of the optical transponder A 110 being reduced, and in response to the roll-off factor of the Tx FIR filter 116 being increased, the central controller 190 (or the controller 118 of the optical transponder A 110) can determine if the BER value of a third optical signal satisfies the third threshold. In other words, the central controller 190 (or the controller 118 of the optical transponder A 110) can determine if the performance of the optical communication system 100 improves in response to the reduction in the data baud rate of the optical transponder A 110 and the increase of the roll-off factor of the Tx FIR filter 116. If the performance of the optical communication system 100 has not improved and the BER value has not satisfied the third threshold, the central controller 190 (or the controller 118 of the optical transponder A 110) can re-adjust the data baud rate of the optical transponder A 110. The data baud rate and the roll-off factor can be adjusted when live data traffic (e.g., the first optical signal, the second optical signal, the third optical signal, and/or the like) are transmitted from the optical transponder A to the optical transponder B.

In use, in response to the skew value of the first optical signal satisfying the first threshold, and in response to the BER value of the first optical signal satisfying the second threshold, the central controller 190 (or the controller 118 of the optical transponder A 110) can adjust a wavelength of one or more channels at the optical transponder A 110. For example, the wavelength of the degraded channel and the wavelengths of its adjacent channels at the optical transponder A 110 can be adjusted. In some implementations, the central controller 190 (or the controller 118 of the optical transponder A 110) can adjust (or cause to be adjusted), based on the adjustments of the wavelength of the channel at the optical transponder A 110, a wavelength of a channel of the WSS A 111. In some implementations, the central controller 190 (or the controller 118 of the optical transponder A 110) can adjust (or cause to be adjusted), based on the adjustments of the wavelength of the channel at the optical transponder A 110, a wavelength of a channel of the optical transponder B 150, or the bandwidth of the channel of the transponder B 150 (RxBw). In some instances, the data baud rate remains the same while the wavelength of the optical transponder A 110 is being adjusted. Thus, by adjusting the wavelength of the channel at the optical transponder A 110, (and in some instances, adjusting the wavelength of the WSS A 111, the wavelength of the WSS B 151, the wavelength of a channel at the optical transponder B, and the RxBw) the channel spacing (ChSp) is increased In some implementations, the central controller 190 (or the controller 118 of the optical transponder A 110) can send a control signal to adjust (or cause to be adjusted), based on the performance degradation, a modulation format of a first channel from a set of transmitter channels of the optical transponder A 110 from a first modulation format to a second modulation format. In some instances, the modulation formats of its adjacent channel can be adjusted accordingly from the first modulation format to the second modulation format. In other instances, the modulation formats of its adjacent channel can remain the same (or not be adjusted). Stated differently, the method includes sending a control signal to adjust, based on the performance degradation, a modulation format of a first transmitter channel from a set of transmitter channels of the optical transponder A 110 from a first modulation format to a second modulation format, and not adjust a modulation format of a second transmitter channel from the set of transmitter channels and a modulation format of a third transmitter channel from the set of transmitter channels from the first modulation format to the second modulation format. The first modulation format is different from the second modulation format.

Figure 2:
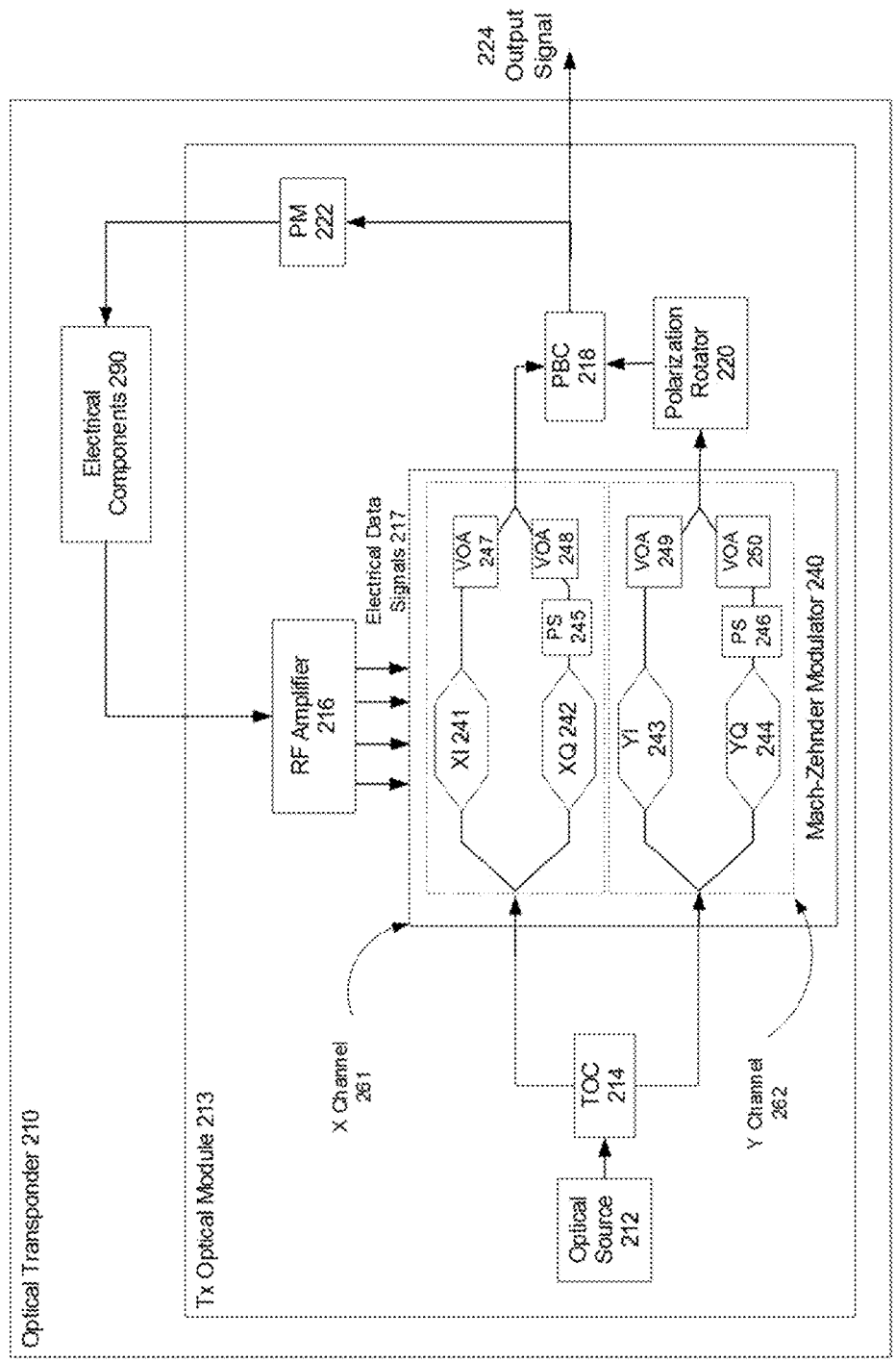
FIG. 2 is a block diagram illustrating an optical transponder, according to an embodiment.

FIG. 2 is a block diagram illustrating an optical transponder 210, according to an embodiment. The optical transponder 210 can be structurally and/or functionally similar to the optical transponder A 110 and the optical transponder B 150 in FIG. 1. Optical transponder 210 can be a hardware module in an optical communication system (such as the optical communication system 100 in FIG. 1) and can include a transmitter (Tx) optical module 213, one or more electrical components 290, and a receiver (Rx) optical module (now shown). The Tx optical module 213 can be structurally and/or functionally similar to Tx optical module 113 and the Tx optical module 153 in FIG. 1. The optical transponder 210 can be implemented using free-space optics, fiber optics, integrated optics (e.g., Si, SiN, Silica, III-V, etc. optics), or the like. Each component of optical transponder 210 can be operatively coupled to another component(s) of optical transponder 210.

The one or more electrical components 290 can include a controller, a digital signal processing chip, a forward error correction (FEC) encoder, a transmitting (Tx) finite impulse response (FIR) filter, a digital-to-analog (DAC) converter, a skew monitor, an analog-to-digital converter, a receiving FIR filter, an impairments compensation processor, an FEC decoder, and/or the like. The controller, the forward error correction (FEC) encoder, the transmitting (Tx) finite impulse response (FIR) filter, the digital-to-analog converter (DAC), the skew monitor, the analog-to-digital converter (ADC), the receiving (Rx) FIR filter, the impairments compensation processor, the FEC decoder can be structurally and functionally similar to the controllers 118 and 160, the forward error correction (FEC) encoder 117, the transmitting (Tx) finite impulse response (FIR) filter 116, the digital-to-analog (DAC) converter 115, the skew monitors 119 and 159, the ADC 155, the Rx FIR filter 156, the impairments compensation processor 157, and the FEC decoder 158, respectively described in FIG. 1.

The Tx optical module 213 can receive electrical signals from the one or more electrical components 290 and output an optical signal(s) 224 to an optical device (such as the WSS A 111 in FIG. 1). The Tx optical module 213 can include an optical source 212, a tunable optical coupler (TOC) 214, a radio frequency (RF) amplifier 216, a polarization beam combiner (PBC) 218, a polarization rotator 220, a power meter 222, and a Mach-Zehnder Modulator ("Modulator" or "MZM") 240. In some implementations, the MZM 240 can include a set of tributary modulators 241-244, a set of variable optical attenuators/amplifiers (VOAs) (247, 248, 249, 250), and a set of phase shifters (PS) (245, 246). In some implementations, the Tx optical module 213 can also include a polarizer (not shown), a polarization controller (not shown), and/or a polarization splitter (not shown).

Optical source 212 can include a device capable of producing and/or transmitting an optical output (or an optical beam). For example, optical source 212 can include a laser diode, a semiconductor laser, and/or a continuous wave laser. Optical source 212 can be any type of laser that is usable for high bit rate optical signal transmission, for example, a narrow linewidth laser in the 1550 nm wavelength range (so-called C-Band), but can be tuned to or implemented for any wavelength.

TOC 214 can include a device and/or circuitry capable of controlling a coupling ratio of optical input portions. For example, TOC 214 can receive an optical output from optical source 212 and cause a first portion of the optical signal to be provided to a first tributary modulator (e.g., an X channel modulator applied to an X channel 261) and a second portion of the optical signal to be provided to a second tributary modulator (e.g., a Y channel modulator applied to a Y channel 262) with a particular ratio of the first portion to the second portion. In some implementations, TOC 214 can adjust the coupling ratio based on a control signal. For example, based on receiving a control signal from a controller within the electrical components 290, TOC 214 can adjust the coupling ratio to increase the first portion relative to the second portion, decrease the first portion relative to the second portion, or the like, thereby reducing a power imbalance of portions of the optical signal. In some implementations, TOC 214 can be included in a beam splitter (not shown) or another device (not shown) capable of splitting the optical signal or a portion thereof.

MZM 240 can modulate an optical signal received from TOC 214 with a set of electrical data signals 217 received from RF amplifier 216. For example, MZM 240 can produce a modulated signal, which can vary one or more properties (e.g., amplitude/intensity, phase, frequency/wavelength, polarization, etc.) of an output (e.g., a carrier wave) produced by optical source 212. In some implementations, MZM 240 can include or be replaced with an indium phosphide semiconductor-based modulator, an electro-absorption modulator, a phase modulator, an intensity modulator (e.g., an OOK modulator), a return to zero (RZ) modulator, a non-return to zero (NRZ) modulator, a PSK modulator, a binary PSK (BPSK) modulator, a Quad PSK (QPSK) modulator, a QAM modulator, an M-ary QAM (M-QAM) modulator, any polarization multiplexed (PM) versions of the above listed modulators (e.g., a DPBPSK modulator, a DPQAM modulator, or the like), and/or any other modulator or combination of modulators.

In some implementations, MZM 240 can cause an optical output (or an optical beam) from the TOC 214 to be split into a set of tributary channels (e.g., a first tributary channel and a second tributary channel). For example, MZM 240 may cause the optical output (or an optical beam) from the TOC 214 to be split into an X channel 261 and a Y channel 262, an I channel and a Q channel, an XI channel 241 and an XQ channel 242, a YI channel 243 and a YQ channel 244, or the like. In some implementations, MZM 240 may cause the optical output (or an optical beam) from the TOC 214 to be split into a set of portions, such as a set of orthogonal portions, a set of non-orthogonal portions, or the like.

In some embodiments, MZM 240 can receive a control signal from the controller within the electrical components 290 (via a feedback loop (not shown)), and can adjust the operating condition of MZM 240 using the control signal. For example, MZM 240 can combine the electrical data signals 217 and the control signal to adjust operational settings of VOAs 247-250 and modulate the input optical signal.

In some implementations, MZM 240 can include a set of tributary modulators 241-244. Each tributary modulator from the set of tributary modulators 241-244 can modulate an optical output (or an optical beam) from the TOC 214 in the corresponding tributary channel from a set of tributary channels 241-244. For example, MZM 240 can include an X channel modulator 261 and a Y channel modulator 262. The X channel modulator 261 can include an XI channel modulator 241, an XQ channel modulator 242, an X channel phase shifter 245, and optional VOAs 247 and 248. The Y channel modulator 262 can include a YI channel modulator 243, a YQ channel modulator 244, a Y channel phase shifter 246, and optional VOAs 249 and 250. The XI channel modulator 241 can modulate an optical signal in the XI tributary channel; the XQ channel modulator 242 can modulate an optical signal in the XQ tributary channel; the YI channel modulator 243 can modulate an optical signal in the YI tributary channel; the YQ channel modulator 244 can modulate an optical signal in the YQ tributary channel.

In some embodiments, MZM can include a QAM modulator (not shown) with two tributary modulators, one to modulate signals on the I channel, and one to modulate signals on the Q channel. An optical coupler can combine the signals at the I and Q channels to generate the output signal. Alternatively, MZM can include two tributary modulators, one to modulate signals at the X polarization, and one to modulate signals at the Y polarization. For the embodiment shown in FIG. 2, the MZM 240 can combine the signals at the X and Y polarizations to generate the output signal. For example, MZM 240 can include a dual polarization-QAM (DP-QAM) modulator (as shown in FIG. 2) with four tributary modulators 241-244, one to modulate signals at the XI channel, one to modulate signals at the XQ channel, one to modulate signals at the YI channel, and one to modulate signals at the YQ channel.

The output optical signal from at least one of the tributary channels (e.g., from XQ channel modulator 242, or YQ channel modulator 244) can be phase shifted to a particular phase with respect to another tributary channel by a phase shifter, such as X channel phase shifter 245, Y channel phase shifter 246, and/or the like. For example, the output optical signal of XQ channel modulator 242 can be phase shifted by X channel phase shifter 245 with respect to another output optical signal of XI channel modulator 241. In some implementations, X channel phase shifter 245 and/or Y channel phase shifter 246 can apply a particular phase shift (e.g., a 0 degree phase shift, a 90 degree phase shift, a 180 degree phase shift, or the like) to one of an XI channel or an XQ channel and/or one of a YI channel or a YQ channel, respectively.

VOAs 247-250 can be or include a device to control an optical power of an optical signal. For example, VOA 247 can receive an optical signal and can amplify or attenuate the optical signal to alter the optical power of the optical signal. In some implementations, VOA 247 can alter the optical power of the optical signal based on a control signal. For example, based on receiving a control signal from the controller within the electrical components 290, VOA 247 can alter a level of amplification or attenuation of the optical signal or a portion thereof to reduce a power imbalance between portions of the optical signal. In some implementations, one or more VOAs 247-250 can be optionally included or excluded from MZM 240.

The optical signal output from at least one of the tributary channels (e.g., from Y channel modulator 262) can be rotated to a particular polarization by polarization rotator 220. In some implementations, polarization rotator 220 may rotate the output optical signal from at least one of the tributary channels such that the output signal from X channel modulator 261 and the output signal from Y channel modulator 262 are orthogonal (or approximately orthogonal).

Polarization beam combiner (PBC) 218 can combine optical signals from each tributary channel and produce an output signal 224. For example, PBC 218 can receive optical signals from polarization rotator 220, which rotates optical signals from Y channel modulator 262. PBC 218 can also receive optical signals from X channel modulator 261 and combine with the optical signals from polarization rotator 220 to produce an output signal 224.

A power meter (PM) 222 can be operatively coupled to PBC 218 and a controller in the electrical components 290 and configured to measure optical power of the output signal 224. In some implementations, PM 222 can include a photo diode, a low-speed detector (e.g., a less than approximately 100 Megabits per second (Mbits/s) detector) and/or a high-speed detector (e.g., a greater than approximately 100 Mbits/s detector).

FIGS. 3A-3B are graphs illustrating a theoretical analysis of a dynamic adjustment of the roll-off factor α to improve skew tolerance of an optical transponder, according to an embodiment. The parameter controlling the bandwidth of the raised cosine Nyquist filter is the roll-off factor α. A transmitting (Tx) finite impulse response (FIR) filter (such as the Tx FIR filter 116 in FIG. 1) can be a Nyquist filter. The roll-off factor α is one (α=1) if the ideal low pass filter bandwidth is doubled, that is the stopband goes to zero at twice the bandwidth ($2f_N$) of an ideal brick wall filter at $f_N$. If α is 0.5, a total bandwidth of $1.5f_N$ would result, and so on. On the one hand, the lower the value of the roll-off factor α, the more compact the spectrum becomes but the longer time it takes for the impulse response to decay to zero, and thus the lower the system's tolerance to skew. On the other hand, the greater the value of the roll-off factor α, the stronger the channel crosstalk.

The roll-off factor α can impact the optical communication system's tolerance to residual IQ skew. When the roll-off factor α of the Nyquist filter is 0.1, the frequency response of the Nyquist filter is close to a rectangular shape, which allows near-symbol rate-equivalent spacing between adjacent optical channels with negligible crosstalk. However, a small roll-off factor α can reduce eye width, and thus aggravate the optical communication system's skew tolerance. When the roll-off factor α of the Nyquist filter is 1, its frequency response is a raise-cosine shape. It can cause strong crosstalk among DWDM channels. A larger channel spacing (ChSp) between adjacent optical channels can minimize crosstalk, which reduces the spectral efficiency. Thus, a certain trade-off between the spectral efficiency and the roll-off factor α can be made to improve the tolerance of residual IQ skew.

FIG. 3A shows that when an optical communication system is calibrated and has minimum IQ skew, the roll-off factor α of the Nyquist filter can be set to be close to zero (e.g., 0.1) 301 to minimize the intersymbol interference ("ISI"). For example, for a 400 G 16QAM optical communication system with a baud rate of 64 GB/s, when the roll-off factor α of the Nyquist filter is close to zero, the channel spacing between adjacent optical channels can be close to 75 GHz 302. As the IQ skew of some channels drifts, for example, over time and temperature, the roll-off factor α of the Nyquist filter associated with the drifted channel(s) can be adjusted to improve its IQ skew tolerance. As shown in FIG. 3B, when the roll-off factor α of the Nyquist filter increases from zero to close to 0.5 (303) and close to 1 (304), the channel spacing $ChSp_2$ 305 and $ChSp_3$ 306 increases accordingly. As the channel spacing $ChSp_2$ 305 and $ChSp_3$ 306 increases, the guard bands 307 between the optical channels can be reduced, and the central wavelengths of the drifted channels, 303 and 304, and the adjacent channels 308 can be adjusted accordingly.

FIGS. 4A-4C show simulated eye diagrams with 16-QAM signal passing through a rooted raised cosine Nyquist filter at various roll-off factors, accordingly to an embodiment. FIG. 4A shows that for a small roll-off factor α (e.g., α=0.1), the eye height 401 is greater than the eye heights 402 and 403 when roll-off factor α is greater in FIGS. 4B and 4C, indicating a lower intersymbol interference (ISI). Meanwhile, the eye width 411 when the roll-off factor α is small in FIG. 4A is narrower than the eye widths 412 and 413 when the roll-off factor α is greater in FIGS. 4B and 4C, indicating a lower tolerance to residual IQ skew. When the roll-off factor α increases to, for example, 0.3 as in FIG. 4B, and 0.5 as in FIG. 4C, the eye heights 402 and 403 decrease, indicating a greater ISI. Meanwhile, the eye widths 412 and 413 increase when the roll-off factor α is greater, indicating a greater tolerance to the residual IQ skew.

In some implementations, the bandwidth of an optical receiver (RxBw of, for example, the optical transponder B 150 in FIG. 1) can be adjusted based on the roll-off factor α. In some instances, the optical receiver can induce ISI into optical signals if the bandwidth of the optical receiver is smaller. In other instances, the inter-channel crosstalk and additive white Gaussian noise (AWGN) can be induced if the bandwidth of the optical receiver is greater. The length of an adaptive equalizer in a digital signal processing chip (EqLn) can influence the performance.

Figure 5:
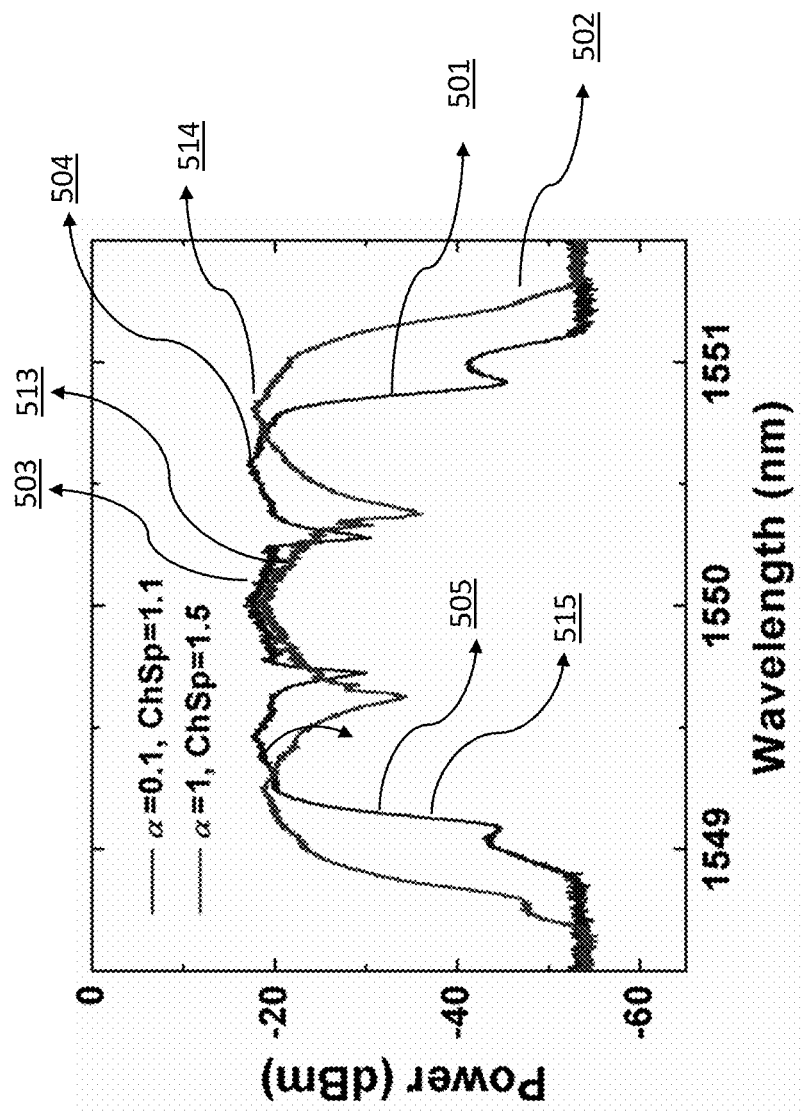
FIG. 5 shows an optical spectrum of aggressor channels, according to an embodiment.

FIG. 5 shows an optical spectrum of aggressor channels, according to an embodiment. In some instances, the inter-channel crosstalk can act as white Gaussian noise for the channel under testing (channels 503 and 513), an amplified spontaneous emission (ASE) (not shown in the figures) can be used to emulate adjacent aggressor channels (channels 504, 514, 505, 515). The channel under testing (channels 503 and 513) can be referred to as "a victim channel." An aggressor channel (channels 504, 514, 505, 515) cross-couples with the victim channel (channels 503 and 513). An ASE is a source of light, produced by spontaneous emission, that has been optically amplified by the process of stimulated emission in a gain medium. The ASE can be coupled to a wavelength selective switch (WSS) (e.g., the WSS A 111 in FIG. 1). A high-resolution optical spectrum analyzer (with a resolution of, for example, 10 pm) (not shown in the figure) can be used to measure the spectrum of the channel under testing. The spectrum can then be down-sampled to, for example, 100 pm resolution and loaded into the wavelength selective switch (WSS) (e.g., the WSS A 111 in FIG. 1) to emulate aggressor channels. As shown in FIG. 5, the optical spectrum, 501 and 502, of the aggressor channels have substantially the same spectral shape and power level as the channel under testing. The curve 501 represents the optical spectrum of the aggressor channels when the roll-off factor α is equal to or close to 0.1 and the channel spacing between the adjacent optical channels is equal to or close to 1.1. The curve 502 represents the optical spectrum of the aggressor channels when the roll-off factor α is equal to or close to 1 and the channel spacing between the adjacent optical channels is equal to or close to 1.5. In some instances, the WSS can act as a variable optical attenuator such that the power level of the aggressors is adjusted according to the channel under testing. In some instances, there is a difference between the spectral shape of the channel under testing and the aggressor channels generated by the WSS, which can be contributed by the limited resolution of WSS.

FIGS. 6A-6D show measured eye diagrams of an optical transponder (for example, 400 G, 64 GB/s, 16QAM) with an IQ skew of 4 ps, according to an embodiment. FIG. 6A shows a simulated eye diagram of an in-phase (I channel) tributary channel of an optical transponder when the roll-off factor α is close to 0.1. FIG. 6B shows a measured eye diagram of a quadrature tributary channel (Q channel) of an optical transponder when the roll-off factor α is close to 0.1. FIG. 6C shows a measured eye diagram of an in-phase (I) tributary channel of an optical transponder when the roll-off factor α is close to 1. FIG. 6D shows a measured eye diagram of a quadrature tributary channel (Q channel) of an optical transponder when the roll-off factor α is close to 1. As shown in FIG. 6A and FIG. 6B, the shifts between the eye diagram of the I channel 601 and the eye diagram of the Q channel 602 represents an IQ skew (e.g., 4 ps IQ skew).

Similarly, as shown in FIG. 6C and FIG. 6D, the shifts between the eye diagram of the I channel 603 and the eye diagram of the Q channel 604 represents the IQ skew (e.g., 4 ps IQ skew). As the roll-off factor α increases from 0.1 to 1, the eye widths increase from 611 to 612, indicating that the IQ skew tolerance is improved with a greater roll-off factor α.

FIGS. 7A-7D show the measured penalty of $Q^2$ factor as a function of an IQ skew of an optical transponder, according to an embodiment. The penalty of $Q^2$ factor can be calculated relative to an IQ skew of 0 ps. In some instances, the penalty of $Q^2$ factor can be used as the comparison metric so that the other factors like, for example, implementation penalty can be removed. FIG. 7A shows the penalty of $Q^2$ factor 701 as a function of the IQ skew 702 when the baud rate is 45 GB/s 703, 56 GB/s 704, and 64 GB/s 705. As the baud rate increases from 45 GB/s 703 to 64 GB/s 705, the penalty of $Q^2$ factor at a certain IQ skew increases. For example, when the IQ skew is 5 ps, the penalty of $Q^2$ factor when the baud rate is 64 GB/s is greater than the penalty of $Q^2$ factor when the baud rate is 45 GB/s. FIG. 7B shows the penalty of $Q^2$ factor 711 as a function of the IQ skew 712 when the modulation format is QPSK 713, 16 QAM 714 and 64 QAM 715. As the order of the modulation format increases from the QPSK 713, to 64 QAM 715, the penalty of $Q^2$ factor at a certain IQ skew increases, indicating a decreasing tolerance of IQ skew. For example, when the modulation format is 64-QAM, the IQ skew tolerance is less than 2 ps. The optical receiver cannot recover the transmitted signal (i.e., the IQ skew tolerance is greater than 2 ps.) FIG. 7C shows the penalty of $Q^2$ factor 721 as a function of the IQ skew 722 for the X polarization channel 723, the Y polarization channel 724, and the skew between the X polarization channel and the Y polarization channel 725. The penalty of $Q^2$ factor from IQ skew, 723 and 724, is greater than that from the XY skew 725. In some instances, the XY skew 725 can be similar to the polarization mode dispersion (PMD), which can be compensated by a 2×2 butterfly filter. As shown in FIG. 7C, the IQ skew in the X polarization 723 has the similar effect as the IQ skew in the Y polarization 724. FIG. 7D shows the penalty of $Q^2$ factor 731 as a function of the IQ skew 732 as the roll-off factor α is close to 0.1 (733), 0.5 (734), and 1 (735). As the roll-off factor α increases from 0.1 (733) to 1 (735), the penalty of $Q^2$ factor at a certain IQ skew decreases, indicating an increasing tolerance of IQ skew.

Figures 8A, 8B:
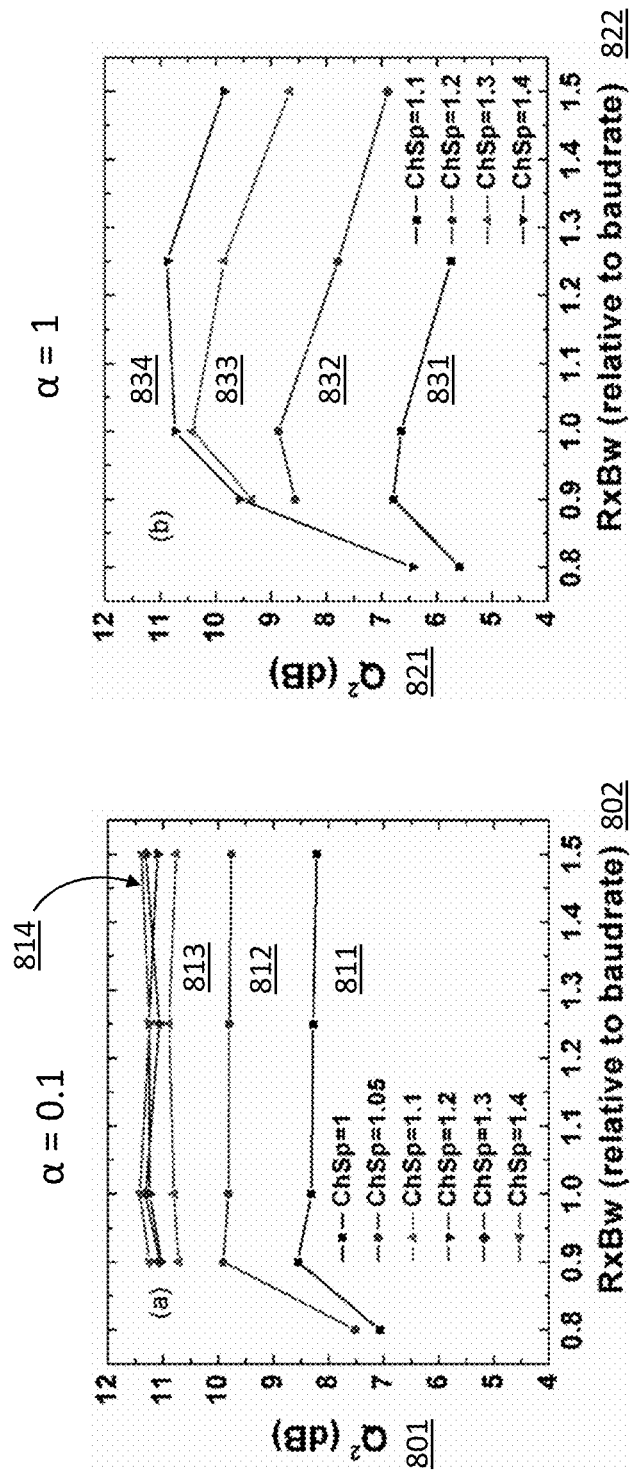
FIGS. 8A-8B show the $Q^2$ factor as a function of the bandwidth of the optical receiver (RxBw) with zero residual IQ skew, according to an embodiment.

FIGS. 8A-8B show the $Q^2$ factor as a function of the bandwidth of the optical receiver (RxBw) with zero residual IQ skew, according to an embodiment. The bandwidth of the optical receiver (RxBw) was normalized against the baud rate. In these implementations, the RxBw is adjusted through the setting of the oscilloscope or the FIR filter of the optical receiver. FIG. 8A shows the $Q^2$ factor 801 as a function of the bandwidth of the optical receiver (RxBw) 802 when the roll-off factor α is close to 0.1. As shown in FIG. 8A, the spectral shape is close to a rectangular shape. When the RxBw 802 is greater than a certain value (e.g., 1.0), further increasing of RxBw does not influence the $Q^2$ factor. When the RxBw is less than a certain value (e.g., 0.9), a sharp decrease of the $Q^2$ factor incurs. The curves 811, 812, 813, and 814 show the $Q^2$ factor 801 as a function of the bandwidth of the optical receiver (RxBw) 802 when the channel spacing (ChSp) is at 1, 1.05, 1.1, and 1.4, respectively. When the ChSp is at 1.1 (813), any further increase of the ChSp only leads to a small increase of the $Q^2$ factor. Thus, the improved value of ChSp when the roll-off factor α is close to 0.1 can be set to 1.1 times of the baud rate. FIG. 8B shows the $Q^2$ factor 821 as a function of the bandwidth of the optical receiver (RxBw) 822 when the roll-off factor α is close to 1. As shown in FIG. 8B, when the RxBw 822 is greater than a certain value (e.g., 1.0), further increasing of the RxBw degrades the $Q^2$ factor, which might be due to the crosstalk from adjacent channels. The curves 831, 832, 833, and 834 show the $Q^2$ factor 821 as a function of the bandwidth of the optical receiver (RxBw) 822 when the channel spacing (ChSp) is at 1.1, 1.2, 1.3, and 1.4, respectively. When the ChSp is at 1.3 (833), any further increase of the ChSp only leads to a small increase of $Q^2$ factor. Thus, the improved value of ChSp when the roll-off factor α is close to 1 can be set to 1.3 times of the baud rate.

Figure 9:
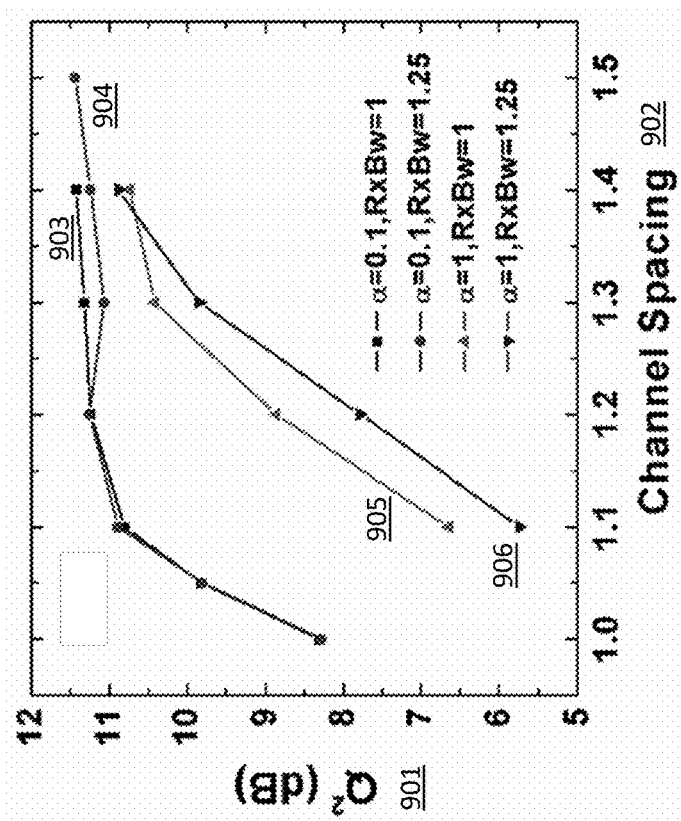
FIG. 9 shows the $Q^2$ factor as a function of the channel spacing (ChSp) with zero residual IQ skew, according to an embodiment.

FIG. 9 shows the $Q^2$ factor as a function of the channel spacing (ChSp) with zero residual IQ skew, according to an embodiment. The curve 903 shows the $Q^2$ factor 901 as a function of the channel spacing (ChSp) 902 when the roll-off factor α is close to 0.1 and the bandwidth of the optical receiver (RxBw) is close to the baud rate. The curve 904 shows the $Q^2$ factor 901 as a function of the channel spacing (ChSp) 902 when the roll-off factor α is close to 0.1 and the bandwidth of the optical receiver (RxBw) is close to 1.25 times of the baud rate. The curve 905 shows the $Q^2$ factor 901 as a function of the channel spacing (ChSp) 902 when the roll-off factor α is close to 1 and the bandwidth of the optical receiver (RxBw) is close to the baud rate. The curve 906 shows the $Q^2$ factor 901 as a function of the channel spacing (ChSp) 902 when the roll-off factor α is close to 1 and the bandwidth of the optical receiver (RxBw) is close to 1.25 times of the baud rate. When the roll-off factor α is close to 0.1 and the ChSp is close to the improved value of 1.1 (as described with respect to FIG. 8A), there is no significant difference between when RxBw is close to the baud rate and when RxBw is close to 1.25 times of the baud rate. This can be due to that when RxBw is close to the baud rate, most spectral content of signal can be captured given the rectangular shape of the spectrum. Thus, the improved value of the RxBw can be set to be close to the baud rate when the roll-off factor α is close to 0.1. When the roll-off factor α is close to 1 and the ChSp is close to the improved value of 1.3 (as described with respect to FIG. 8B), the $Q^2$ factor performs better when the RxBw is close to 1.25 times of the baud rate than the RxBw is close to the baud rate. This can be due to the spectrum being more spread-out when the roll-off factor α is close to 1. When RxBw is close to the baud rate, not all spectral content of signal is captured, leading to certain penalty to the $Q^2$ factor. Thus, the improved value of the RxBw can be set to be close to 1.25 times of the baud rate when the roll-off factor α is close to 1.

Figure 10:
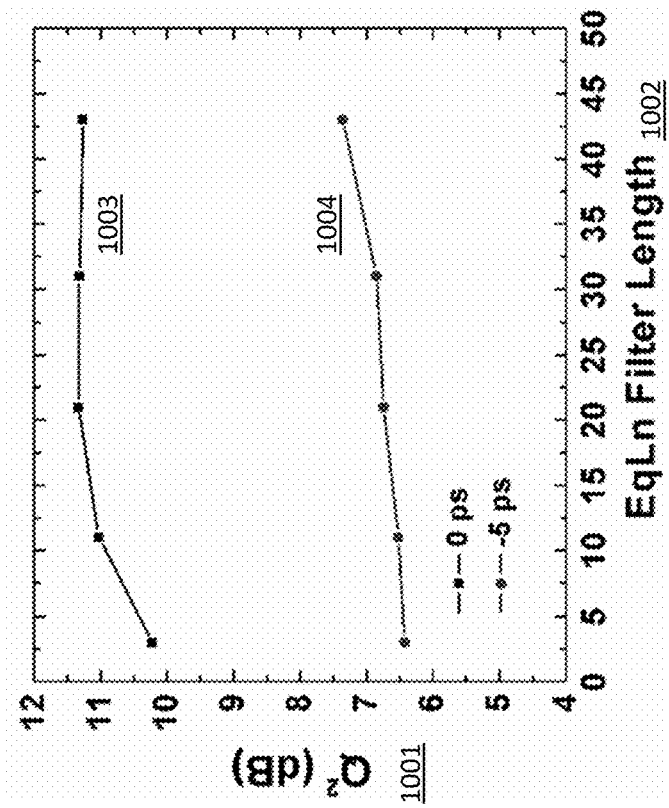
FIG. 10 shows the $Q^2$ factor as a function of the length of adaptive equalizer filter (EqLn), according to an embodiment.

FIG. 10 shows the $Q^2$ factor as a function of the length of adaptive equalizer filter (EqLn), according to an embodiment. The digital signal processor ("DSP") of the optical receiver (e.g., the optical transponder B 150 in FIG. 1) can include an adaptive equalizer that equalizes waveform distortion caused by bandwidth limitation, polarization mode dispersion ("PMD"), and/or the like. The compensation for waveform distortion and adaptive equalization with respect to time-varying propagation characteristic of optical transmission paths can be realized using the DSP. As a result, the performance of the optical communication system 100 can be improved. The adaptive equalizer can be a time-domain equalizer or a frequency-domain equalizer. As shown in FIG. 10, curves 1003 and 1004 show the $Q^2$ factor 1001 as a function of the length of adaptive equalizer filter (EqLn) 1002 when the roll-off factor α of the Tx FIR filter (e.g., the Tx FIR filter 116 in FIG. 1) is close to 0.1 and the optical transmitter (e.g., the optical transponder A 110 in FIG. 1) with a 16-QAM modulation transmits signals at 64 GB/s. The curve 1003 shows the $Q^2$ factor 1001 as a function of the EqLn 1002 when there is no IQ skew. The curve 1003 indicates that the $Q^2$ factor does not change significantly after EqLn is larger than 21 when the bandwidth limitation is substantially equalized. The curve 1004 shows the $Q^2$ factor 1001 as a function of the EqLn 1002 when the IQ skew is close to 5 ps. The curve 1004 indicates that the $Q^2$ factor shows improvement when EqLn is increased. Specifically, when EqLn is increased from 21 to 43, the $Q^2$ factor improves about 0.6 dB. This shows that the adaptive equalizer can compensate the IQ skew in some degrees. In some instances, however, the increased complexity in the DSP outweighs the improvement on $Q^2$ factor. In some implementations, a 21-tap adaptive equalizer can be implemented to improve the performance.

Figures 11A, 11B, 11C:
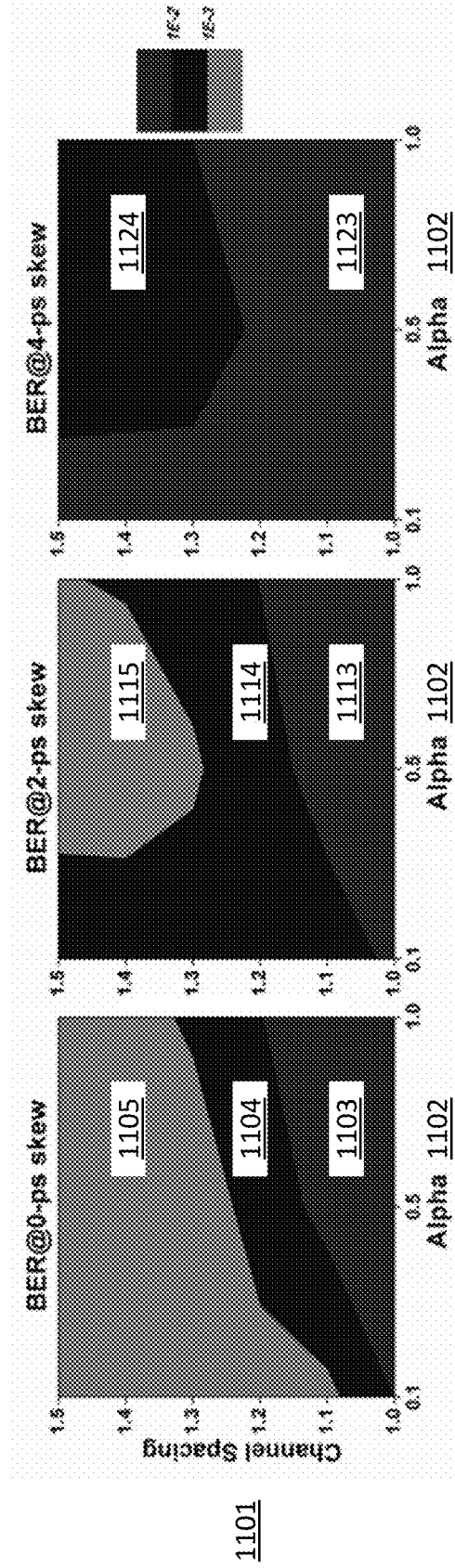
FIGS. 11A-11C show contour plots of the channel spacing of adjacent optical channels (ChSp) and the roll-off factor $\alpha$ of the Tx FIR filter at various BER values and IP skew values, according to an embodiment.

FIGS. 11A-11C show contour plots of the channel spacing of adjacent optical channels (ChSp) and the roll-off factor α of the Tx FIR filter at various BER values and IQ skew values, according to an embodiment. In these embodiments, the optical transmitter (e.g., the optical transponder A 110 in FIG. 1) transmits 400 G signals at 64 GB/s using 16-QAM modulation format. The channel spacing of adjacent optical channels (ChSp) is normalized to the baud rate. FIG. 11A shows a contour plot of the channel spacing of adjacent optical channels (ChSp) 1101 and the roll-off factor α of the Tx FIR filter 1102 when the IQ skew is zero. Section 1103 shows the contour when the BER value is greater than $10^{-2}$, section 1104 shows the contour when the BER value is less than $10^{-2}$ and greater than $10^{-3}$, and section 1105 shows the contour when the BER value is less than $10^{-3}$. FIG. 11B shows a contour plot of the channel spacing of adjacent optical channels (ChSp) 1101 and the roll-off factor α of the Tx FIR filter 1102 when the IQ skew is 2 ps. Section 1113 shows the contour when the BER value is greater than $10^{-2}$, section 1114 shows the contour when the BER value is less than $10^{-2}$ and greater than $10^{-3}$, and section 1115 shows the contour when the BER value is less than $10^{-3}$. As shown in FIG. 11B, the roll-off factor α is increased from 0.1 to 0.5 with a $10^{-3}$ BER requirement. The ChSp is increased from 1.1 times of the baud rate to 1.3 times of the baud rate, indicating an approximately 18% reduction in the spectral efficiency. FIG. 11C shows a contour plot of the channel spacing of adjacent optical channels (ChSp) 1101 and the roll-off factor α of the Tx FIR filter 1102 when the IQ skew is 4 ps. Section 1123 shows the contour when the BER value is greater than 10', and section 1124 shows the contour when the BER value is less than $10^{-2}$ and greater than $10^{-3}$. As shown in FIG. 11C, the BER degradation is more severe. In some implementations, a control of the IQ skew can be used to improve the performance of ≅400 G coherent optical transponder. In instances when the spectral efficiency is less critical, large roll-off factor can be used for better tolerance to residual IQ skew of coherent optical transponder.

In some implementations, for a single-carrier 400 G application, the 64 GB/s with 16-QAM optical communication system and the 45 GB/s with 64-QAM optical communication system can be used for certain IQ skew tolerance. In some instances, the 64 GB/s with 16-QAM optical communication system is more tolerable to the IQ skew than the 45 GB/s with 64-QAM optical communication system. In some implementations, for a 600 GE application using 64 GB/s and 64-QAM format, the skew tolerance can be less than 2 ps.

Figure 12:
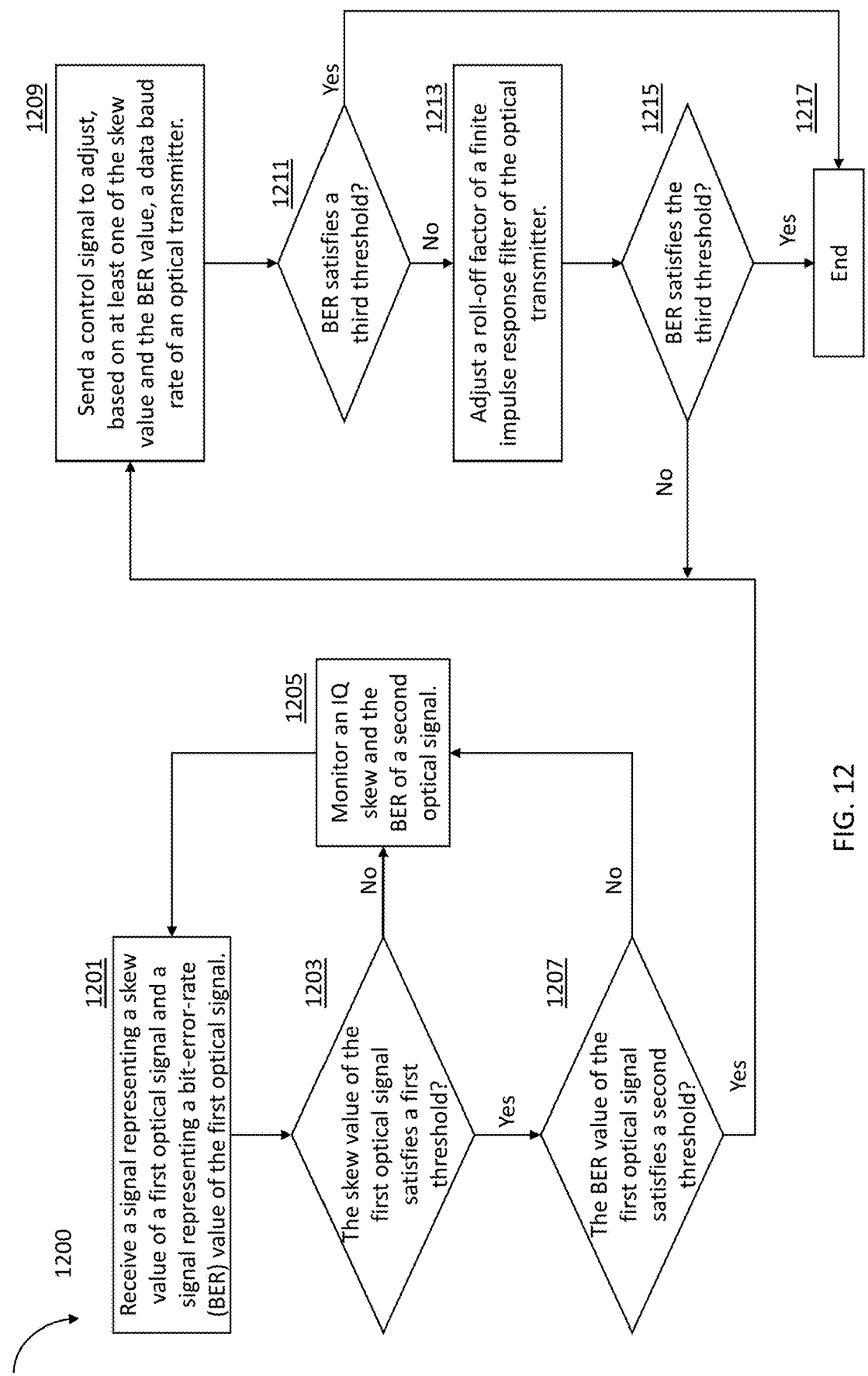
FIG. 12 is a flow chart illustrating a method for the baud rate dynamic control process 1200, according to an embodiment.

FIG. 12 is a flow chart illustrating a method for the baud rate dynamic control process 1200, according to an embodiment. During propagation of an electrical signal (e.g., a DP-QAM signal, a DP-QPSK signal, and/or the like) and due to material defects of each optical modulator (and other factors such as temperature change, material deterioration over time), a skew may occur between the I channels of the electrical signal and the Q channels of the electrical signal (e.g., between the XI and XQ channels and/or between the YI and YQ channels; collectively referred to as an IQ skew). A skew is generated in the electrical domain due to the difference of trace lengths on a print circuit board (PCB). A skew between the I channels of the electrical signal and the Q channels of the electrical signal is referred herein to as an IQ skew (or residual IQ skew). A skew between the X channels of the optical signal and the Y channels of the optical signal is referred herein to as a XY skew. When the electrical signal is modulated into an optical signal through the optical modulator, the skew in the electrical signal is transformed into the skew in optical signal. A skew may refer to a time misalignment between two or more channels. For example, a first channel may be misaligned to a second channel by a particular period of time (e.g., 1 picosecond (ps), 10 ps, 100 ps, etc.), resulting in a symbol of the first channel arriving at an optical receiver at a different time than a symbol of the second channel. When uncompensated (e.g., when the optical signal remains skewed), the IQ skew may degrade network performance for a high data rate optical communication system (e.g., a 400 gigabit per second (Gb/s) system).

Many parameters of the optical communication system can be adjusted to improve the system performance of the optical communication system 100. These parameters include, but are not limited to, for example, the modulation format of an individual channel of an optical transmitter (i.e., the optical transponder A 110), the roll-off factor α of the FIR filter 116 (e.g., Nyquist filter) for an individual channel of the optical transmitter (i.e., the optical transponder A 110), and/or the baud rate of an individual channel of an optical transmitter (i.e., the optical transponder A 110). Other parameters that can be adjusted to improve the system performance of the optical communication system 100 include, but are not limited to, for example, the channel spacing between adjacent channels (ChSp) of the optical transmitter (i.e., the optical transponder A 110) or the optical receiver (i.e., the optical transponder B 150), the bandwidth of the optical receiver (RxBw) (i.e., the optical transponder B 150), and/or the length of adaptive equalizer in the Digital Signal Processing (EqLn) of the optical receiver (i.e., the optical transponder B 150).

Stated similarly, for an optical transmitter (i.e., the optical transponder A 110), parameters of each channel, including, for example, the modulation format, the baud rate, the roll-off factor, the wavelength, and/or the like, can be dynamically adjusted. For an optical receiver (i.e., the optical transponder B 150), the wavelength (of, for example, the local oscillator), the receiver bandwidth (RxBw), and the DSP algorithms (e.g., the length of the adaptive equalizer EqLn) can be dynamically configured and adaptively tuned based on the change of the optical transmitter (i.e., the optical transponder A 110).

The baud rate dynamic control process 1200 can be executed at, for example, a controller such as the central controller 190 or the controller 118 shown and described with respect to FIG. 1. At 1201, the method includes receiving a signal representing a skew value of a first optical signal and a signal representing a bit-error rate (BER) value of a first optical signal. The skew value (i.e., IQ skew) of the first optical signal is the time misalignment between the I channels of the first optical signal and the Q channels of the first optical signal (e.g., between the XI and XQ channels and/or between the YI and YQ channels. The skew value is measured by a skew monitor of an optical receiver that receives the first optical signal. A forward-error-correction ("FEC") decoder of the optical receiver measures the BER value of the first optical signal, which represents the number of bit errors per unit time. The BER value shows a degree of errors that has occurred over the transmission path between an optical transmitter and the optical receiver.

At 1203, the method includes determining if the skew value of the first optical signal satisfies a first threshold. The skew value of the first optical signal satisfies the first threshold when the IQ skew of the first optical signal is greater than the first threshold, indicating that the performance of the optical communication system degrades and is below a defined criteria (indicating the performance is unacceptable). The skew value of the first optical signal does not satisfy the first threshold when the IQ skew of the first optical signal is less than the first threshold, indicating that the performance of the optical communication is above the defined criteria and the performance degradation is small (or acceptable).

At 1205, in response to the skew value of the first optical signal not satisfying the first threshold, the method includes monitoring the IQ skew of a second optical signal received at the optical receiver from the optical transmitter over the transmission paths. The IQ skew of the second optical signal can be monitored by the skew monitor at the optical receiver. The process returns to step 1201 when the optical transmitter receives a signal representing the IQ skew of the second optical signal.

At 1207, the method includes determining if the BER value of the first optical signal satisfies a second threshold. The BER value of the first optical signal satisfies the second threshold when the BER of the first optical signal is greater than the second threshold, indicating that the performance of the optical communication system degrades and is below a defined criteria (indicating the performance is unacceptable). The BER value of the first optical signal does not satisfy the second threshold when the BER of the first optical signal is less than the second threshold, indicating that the performance of the optical communication is above the defined criteria and the performance degradation is small (or acceptable). When the BER value of the first optical signal does not satisfy the second threshold, the BER of the second optical signal can be monitored 1205.

At 1209, in response to the skew value of the first optical signal satisfying the first threshold, and in response to the BER value of the first optical signal satisfying the second threshold, the method includes sending a control signal to adjust, based on at least one of the skew value and the BER value (or based on the performance degradation), a data baud rate of the optical transmitter. The performance of the optical communication system can be improved (and the IQ skew decreases, and the BER value decreases) when the data baud rate of the optical transmitter is reduced.

At 1211, in response to the data baud rate of the optical transmitter being reduced, the method includes determining if the BER value of a second optical signal satisfies a third threshold. In other words, the method includes determining if the performance of the optical communication system improves in response to the reduction in the data baud rate of the optical transmitter. If the performance of the optical communication system improves and the BER value satisfies the third threshold, the method ends 1217. The third threshold can be the same as or different from the second threshold.

At 1213, in response to the BER value of the second optical signal not satisfying the third threshold, the method includes adjusting, based on at least one of the skew value and the BER value (or based on the performance degradation), the roll-off factor of a transmitting (Tx) finite impulse response ("FIR") filter (e.g., a Nyquist filter) of the optical transmitter. In response to the data baud rate of the optical transmitter being reduced (as a result of step 1209), the channel spacing between the adjacent channels increases, while the central wavelength of each channel remains the same. Thus, the roll-off factor of the Tx FIR filter can be increased such that the spectral efficiency of the optical communication system increases.

At 1215, in response to the data baud rate of the optical transmitter being reduced at 1209, and in response to the roll-off factor of the Tx FIR filter being increased at 1213, the method includes determining if the BER value of a third optical signal satisfies the third threshold. In other words, the method includes determining if the performance of the optical communication system improves in response to the reduction in the data baud rate of the optical transmitter (as a result of step 1209) and the increase of the roll-off factor of the Tx FIR filter of the optical transmitter (as a result of step 1213). If the performance of the optical communication system improves and the BER value satisfies the third threshold, the method ends at 1217. If the performance of the optical communication system has not improved and the BER value has not satisfied the third threshold, the method includes returning to step 1209 to adjust the data baud rate of the optical transmitter. The data baud rate and the roll-off factor can be adjusted when live data traffic are transmitted from the optical transmitter to the optical receiver.

Figure 13:
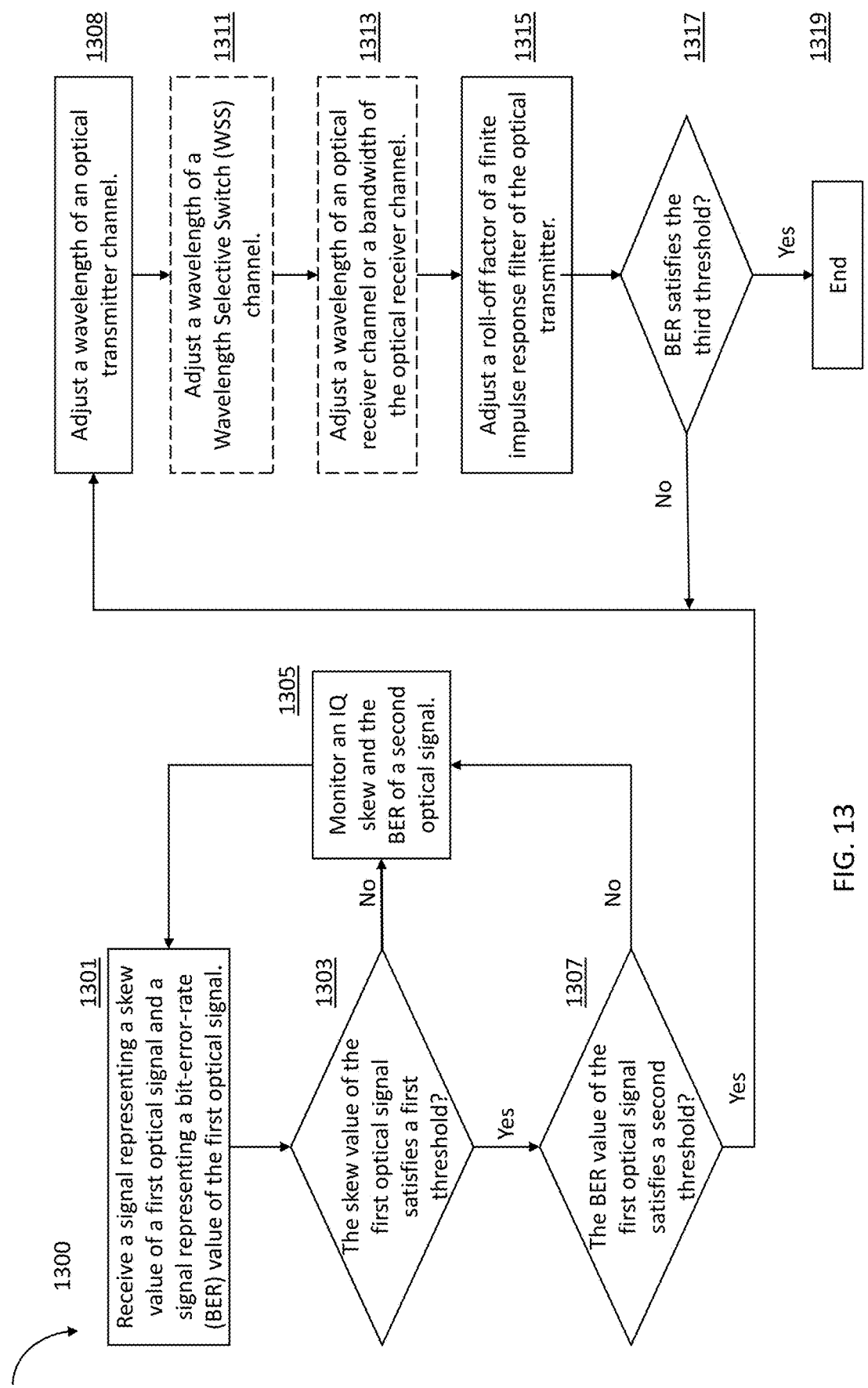
FIG. 13 is a flow chart illustrating a method for the channel spacing dynamic control process, according to an embodiment.

FIG. 13 is a flow chart illustrating a method 1300 for the channel spacing dynamic control process, according to an embodiment. The channel spacing dynamic control process 1300 can be executed at, for example, a controller such as the central controller 190 or the controller 118 shown and described with respect to FIG. 1. At 1301, the method includes receiving a signal representing a skew value (i.e., IQ skew) of a first optical signal and a signal representing a bit-error rate (BER) value of a first optical signal. The skew value (i.e., IQ skew) of the first optical signal is measured by a skew monitor of an optical receiver that receives the first optical signal. A forward-error-correction ("FEC") decoder of the optical receiver measures the BER value of the first optical signal.

At 1303, the method includes determining if the skew value of the first optical signal satisfies a first threshold. The skew value of the first optical signal satisfies the first threshold when the IQ skew of the first optical signal is greater than the first threshold, indicating that the performance of the optical communication system degrades and is below a defined criteria (indicating the performance is unacceptable). The skew value of the first optical signal does not satisfy the first threshold when the IQ skew of the first optical signal is less than the first threshold, indicating that the performance of the optical communication is above the defined criteria and the performance degradation is small (or acceptable).

At 1305, in response to the skew value of the first optical signal not satisfying the first threshold, the method includes monitoring the IQ skew of a second optical signal received at the optical receiver from the optical transmitter over the transmission paths. The IQ skew of the second optical signal can be monitored by the skew monitor at the optical receiver.

At 1307, the method includes determining if the BER value of the first optical signal satisfies a second threshold. The BER value of the first optical signal satisfies the second threshold when the BER of the first optical signal is greater than the second threshold, indicating that the performance of the optical communication system degrades and is below a defined criteria (indicating the performance is unacceptable). The BER value of the first optical signal does not satisfy the second threshold when the BER of the first optical signal is less than the second threshold, indicating that the performance of the optical communication is above the defined criteria and the performance degradation is small (or acceptable). When the BER value of the first optical signal does not satisfy the second threshold, the BER of the second optical signal can be monitored 1305.

At 1308, in response to the skew value of the first optical signal satisfying the first threshold, and in response to the BER value of the first optical signal satisfying the second threshold, the method includes adjusting a wavelength of one or more channels at the optical transmitter. For example, the wavelength of the degraded channel and the wavelengths of its adjacent channels at the optical transmitter can be adjusted.

Optionally at 1311, the method includes adjusting, based on the adjustments of the wavelength of the adjusted channel at the optical transmitter, a wavelength of a channel of a wavelength selective switch (WSS) corresponding to the adjusted channel at the optical transmitter (such as the WSS A 111 and/or the WSS B 151 in FIG. 1). Optionally at 1313, the method includes adjusting, based on the adjustments of the wavelength of the adjusted channel at the optical transmitter, a wavelength of a channel of the optical receiver corresponding to the adjusted channel at the optical transmitter, or the bandwidth of the channel of the optical receiver (RxBw) corresponding to the adjusted channel at the optical transmitter. In some instances during the channel spacing dynamic control process 1300, the data baud rate remains the same. Thus, by adjusting the wavelength of the channel at the optical transmitter (and in some instances, adjusting the wavelength(s) of the WSS, the optical receiver, and the RxBw) the channel spacing (ChSp) is increased.

At 1315, the method includes adjusting the roll-off factor of a transmitting (Tx) finite impulse response ("FIR") filter (e.g., a Nyquist filter) of the optical transmitter. In response to increasing the channel spacing between the adjacent channels, the roll-off factor of the Tx FIR filter can be increased such that the spectral efficiency of the optical communication system increases. In some implementations, the wavelength and the roll-off factor can be fine-tuned at a small step without impacting the in-flight traffic. In other words, the wavelength and the roll-off factor can be adjusted when live data traffic are transmitted from the optical transmitter to the optical receiver.

At 1317, the method includes determining if the BER value of a third optical signal satisfies a third threshold. In other words, the method includes determining if the performance of the optical communication system improves in response to increase in the channel spacing and the increase of the roll-off factor of the Tx FIR filter of the optical transmitter. If the performance of the optical communication system improves and the BER value satisfies the third threshold, the method ends at 1319. If the performance of the optical communication system has not improved and the adjusted BER value has not satisfied the third threshold, the method includes returning to step 1308 to adjust the wavelength of the optical transmitter channel.

In some implementations, the baud rate dynamic control process 1200 and the channel spacing dynamic control process 1300 can be combined. In other implementations, each of the baud rate dynamic control process 1200 and the channel spacing dynamic control process 1300 can be divided. For example, in the baud rate dynamic control process 1200, a wavelength of a channel of the optical transmitter can be adjusted based on at least one of the skew value or the BER value. Similarly, in the baud rate dynamic control process 1200, the wavelength of the WSS, the wavelength of the optical receiver channel, the bandwidth of the optical receiver channel can be adjusted, based on the wavelength of the optical transmitter channel. Similarly, in the channel spacing dynamic control process 1300, the data baud rate can be adjusted.

In some implementations, the method includes sending a control signal to adjust, based on the performance degradation, a modulation format of a first channel from a set of transmitter channels of the optical transmitter from a first modulation format to a second modulation format. In some instances, the modulation formats of its adjacent channel can be adjusted accordingly from the first modulation format to the second modulation format. In other stances, the modulation formats of its adjacent channel can remain the same (or not be adjusted). Stated differently, the method includes sending a control signal to adjust, based on the performance degradation, a modulation format of a first transmitter channel from a set of transmitter channels of the first optical transponder from a first modulation format to a second modulation format, and not adjust a modulation format of a second transmitter channel from the set of transmitter channels and a modulation format of a third transmitter channel from the set of transmitter channels from the first modulation format to the second modulation format. The first modulation format is different from the second modulation format.

In some implementations, during an initial calibration of the optical communication system, the IQ skew is compensated and thus, a higher roll-off factor $\alpha$ can improve the spectral efficiency. As the optical signals propagate in the optical communication system, the IQ skew occurs. Increasing the roll-off factor $\alpha$ improves the optical communication system's tolerance to the IQ skew, while the spectral efficiency decreases.

In some implementations, when an optical communication system updates from, for example, 200 G data traffic using the QPSK modulation format to, for example, 400 G data traffic using 16-QAM modulation format, the spectral efficiency increases. Thus, increasing the roll-off factor $\alpha$ improves the optical communication system's tolerance to the IQ skew, while the overall spectral efficiency of the 400 G optical communication system with 16-QAM modulation format improves due to the upgrade to the 400 G and 16-QAM modulation format.

In some implementations, more IQ-skew margin can be allocated for each channel, before the Tx and the Rx optical modules are put in operation. Initially, the IQ skew can be calibrated to zero. As the IQ skew drifts over, for example, time and temperature, a certain amount of skew margin can be implemented in a system pre-configuration by applying greater roll-off factor and channel spacing.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A method, comprising:
receiving a first signal representing a skew value of an optical signal and a second signal representing a bit-error-rate (BER) value of the optical signal, the optical signal transmitted from an optical transmitter to an optical receiver, the skew value associated with a skew between an in-phase component of the optical signal and a quadrature component of the optical signal;
determining, based on at least one of the skew value or the BER value, if a performance degradation of the optical transmitter satisfies a threshold;
when the performance degradation of the optical transmitter satisfies the threshold:
sending a first control signal to the optical transmitter to adjust, based on the performance degradation, a wavelength characteristic of the optical transmitter;
sending a second control signal to a Wavelength Selective Switch (WSS) operatively coupled to the optical transmitter to adjust, based on the wavelength characteristic of the optical transmitter, a wavelength characteristic of the WSS; and
sending a third control signal to the optical transmitter to adjust, based on the performance degradation, a data baud rate of the optical transmitter.

2. The method of claim 1, further comprising:
when the performance degradation of the optical transmitter satisfies the threshold, sending a fourth control signal to the optical transmitter to adjust, based on the performance degradation, a pulse shaping of the optical transmitter.

3. The method of claim 1, further comprising:
when the performance degradation of the optical transmitter satisfies the threshold, sending a fourth control signal to the optical transmitter to adjust, based on the performance degradation, a pulse shaping of the optical transmitter, the pulse shaping of the optical transmitter including a roll-off factor of a finite impulse response (FIR) filter of the optical transmitter.

4. The method of claim 1, further comprising:
when the performance degradation of the optical transmitter satisfies the threshold, sending a fourth control signal to the optical receiver to adjust, based on the wavelength characteristic of the optical transmitter, a wavelength characteristic of the optical receiver.

5. The method of claim 1, wherein:
the first control signal includes information to adjust a wavelength characteristic of a first transmitter channel from a plurality of transmitter channels associated with the optical transmitter; and
the first control signal includes information to adjust a wavelength characteristic of a second transmitter channel from the plurality of transmitter channels and a wavelength characteristic of a third transmitter channel from the plurality of transmitter channels, the second transmitter channel and the third transmitter channel being adjacent transmitter channels to the first transmitter channel.

6. The method of claim 1, wherein:
the sending the third control signal to the optical transmitter to adjust the data baud rate of the optical transmitter includes sending the third control signal to adjust the data baud rate when live data traffic are transmitted from the optical transmitter to the optical receiver.

7. The method of claim 1, further comprising:
when the performance degradation of the optical transmitter satisfies the threshold, sending a fourth control signal to the optical receiver to adjust, based on the performance degradation, a bandwidth of a receiver channel from a plurality of receiver channels of the optical receiver.

8. The method of claim 1, further comprising:
when the performance degradation of the optical transmitter satisfies the threshold:
sending a fourth control signal to the optical transmitter to adjust, based on the performance degradation, a modulation format of a first transmitter channel from a plurality of transmitter channels associated with the optical transmitter from a first modulation format to a second modulation format, and not adjust a modulation format of a second transmitter channel from the plurality of transmitter channels and a modulation format of a third transmitter channel from the plurality of transmitter channels from the first modulation format to the second modulation format, the first modulation format being different from the second modulation format.

9. The method of claim 1, wherein:
the optical signal includes an X polarization channel (X channel) and a Y polarization channel (Y channel), the X channel of the optical signal including an in-phase channel (XI channel) and a quadrature channel (XQ channel), the Y channel of the optical signal including an in-phase channel (YI channel) and a quadrature channel (YQ channel); and
the skew between the in-phase component of the optical signal and the quadrature component of the optical signal is a skew between the XI channel of the optical signal and the XQ channel of the optical signal or a skew between the YI channel of the optical signal and the YQ channel of the optical signal.

10. A method, comprising:
receiving an optical signal from a first optical transponder;
determining a bit-error-rate (BER) value of the optical signal;
determining a skew value of the optical signal, the skew value corresponding to a skew between an in-phase component of the optical signal and a quadrature component of the optical signal;
determining if the skew value satisfies a first threshold or if the BER value satisfies a second threshold; and
when the skew value satisfies the first threshold or the BER value satisfies the second threshold:
sending a first control signal to adjust a wavelength characteristic of the first optical transponder,
sending a second control signal to adjust, based on the wavelength characteristic of the first optical transponder, a wavelength characteristic of a Wavelength Selective Switch (WSS), and
adjusting, based on the wavelength characteristic of the first optical transponder, a wavelength characteristic of a second optical transponder that received the optical signal.

11. The method of claim 10, further comprising:
when the skew value satisfies the first threshold or the BER value satisfies the second threshold, sending, based on at least one of the skew value or the BER value, a third control signal to the first optical transponder causing a roll-off factor of a finite impulse response (FIR) filter of the optical transponder to be adjusted.

12. The method of claim 10, further comprising:
when the skew value satisfies the first threshold or the BER value satisfies the second threshold, sending, based on at least one of the skew value or the BER value, a third control signal to the first optical transponder causing a data baud rate of the first optical transponder to be adjusted.

13. The method of claim 10, wherein:
the first control signal includes information to adjust a wavelength characteristic of a first transmitter channel from a plurality of transmitter channels associated with the first optical transponder; and
the first control signal includes information to adjust a wavelength characteristic of a second transmitter channel from the plurality of transmitter channels and a wavelength characteristic of a third transmitter channel from the plurality of transmitter channels, the second transmitter channel and the third transmitter channel being adjacent transmitter channels to the first transmitter channel.

14. The method of claim 10, further comprising:
when the skew value satisfies the first threshold or the BER value satisfies the second threshold, sending, based on at least one of the skew value or the BER value, a third control signal to the first optical transponder causing a data baud rate of the first optical transponder to be adjusted when live data traffic are transmitted from the first optical transponder.

15. The method of claim 10, wherein:
the wavelength characteristic of the second optical transponder being a bandwidth of a receiver channel from a plurality of receiver channels of the second optical transponder.

16. The method of claim 10, further comprising:
when the skew value satisfies the first threshold or the BER value satisfies the second threshold, sending a third control signal to the first optical transponder to adjust, based on at least one of the skew value or the BER value, a modulation format of a first transmitter channel from a plurality of transmitter channels associated with the first optical transponder from a first modulation format to a second modulation format.

17. An apparatus, comprising:
a memory; and
a processor operatively coupled to the memory, the processor configured to be operatively coupled to a first optical transponder and a second optical transponder,
the processor configured to receive, from the second optical transponder, a first signal representing a skew value of an optical signal and a second signal representing a bit-error-rate (BER) value of the optical signal, the optical signal transmitted from the first optical transponder to the second optical transponder, the skew value associated with a skew between an in-phase component of the optical signal and a quadrature component of the optical signal;
the processor configured to determine, based on at least one of the skew value or the BER value, if a performance degradation associated with the first optical transponder or the second optical transponder satisfies a threshold;
when the performance degradation satisfies the threshold:
sending a first control signal to the first optical transponder to adjust, based on the performance degradation, a wavelength characteristic of the first optical transponder;
sending a second control signal to a Wavelength Selective Switch (WSS) operatively coupled to the first optical transponder to adjust, based on the wavelength characteristic of the first optical transponder, a wavelength characteristic of the WSS; and
sending a third control signal to the first optical transponder to adjust, based on the performance degradation, a data baud rate of the first optical transponder.

* * * * *